United States Patent
Utsunomiya

[11] Patent Number: 6,157,521
[45] Date of Patent: Dec. 5, 2000

[54] RECORDING/REPRODUCING HEAD POSITIONING MECHANISM

[75] Inventor: Motoyasu Utsunomiya, Tokyo, Japan

[73] Assignee: NEC Corporation, Tokyo, Japan

[21] Appl. No.: 09/160,794

[22] Filed: Sep. 25, 1998

[30] Foreign Application Priority Data

Sep. 25, 1997 [JP] Japan ..................................... 9-260680

[51] Int. Cl.$^7$ ...................................................... G11B 5/55
[52] U.S. Cl. ........................................ 360/294.5; 360/260
[58] Field of Search ............................... 360/294, 294.1, 360/294.3, 294.5, 260

[56] References Cited

U.S. PATENT DOCUMENTS

| | | | |
|---|---|---|---|
| 5,189,578 | 2/1993 | Mori et al. | 360/106 |
| 5,216,559 | 6/1993 | Springer | 360/106 |
| 5,303,105 | 4/1994 | Jorgenson | 360/106 |
| 5,521,778 | 5/1996 | Boutaghou et al. | 360/106 |
| 5,657,188 | 8/1997 | Jurgenson et al. | 360/106 |
| 5,745,319 | 4/1998 | Takekado et al. | 360/78.05 |
| 5,764,444 | 6/1998 | Imamura et al. | 360/109 |
| 5,781,381 | 7/1998 | Koganezawa | 360/106 |
| 5,793,571 | 8/1998 | Jurgenson et al. | 360/104 |
| 5,796,558 | 8/1998 | Hanrahan et al. | 360/106 |
| 5,898,541 | 4/1999 | Boutaghou et al. | 360/109 |
| 5,936,805 | 8/1999 | Imaino | 360/104 |

FOREIGN PATENT DOCUMENTS

| | | |
|---|---|---|
| 59-54077 | 3/1984 | Japan . |
| 2-201782 | 8/1990 | Japan . |
| 4-106766 | 4/1992 | Japan . |
| 5-11854 | 1/1993 | Japan . |
| 5-62375 | 3/1993 | Japan . |
| 5-325441 | 12/1993 | Japan . |
| 5-334690 | 12/1993 | Japan . |
| 6-96545 | 4/1994 | Japan . |
| 6-243604 | 9/1994 | Japan . |
| 7-134801 | 5/1995 | Japan . |
| 9-161425 | 6/1997 | Japan . |

*Primary Examiner*—William Klimowicz
*Attorney, Agent, or Firm*—Foley & Lardner

[57] ABSTRACT

The two-stage actuator comprises a fine actuator 2 with an HGA 1, and a coarse actuator 10, which supports the fine actuator 2 secured to it and is rotatably supported. The fine actuator 2 includes an I shape spring 3, a small coil 4 and a yoke 5. The coarse actuator 10 includes a yoke base 8 with permanent magnets 9, facing the small coil 4. The I shape spring 3 has a longitudinally intermediate portion secured to a set set pin member 7 of the coarse actuator 10. A drive force generated in the fine actuator 2 as a result of energizing the small coil 4 with current application thereto, causes flexing of a leaf spring part of the I shape spring 3, thus fine driving the HGA 12 disposed in the fine actuator 2.

4 Claims, 30 Drawing Sheets

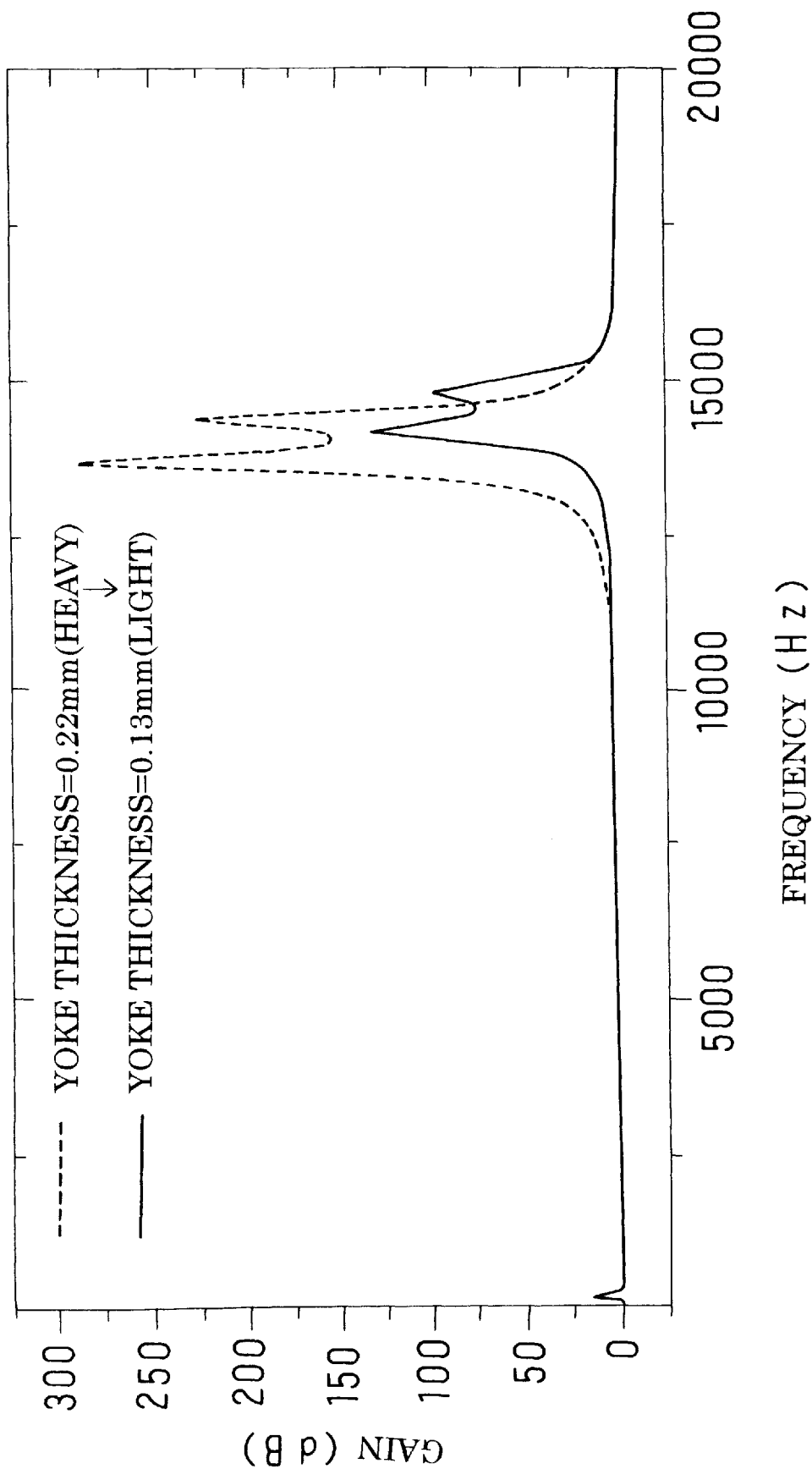

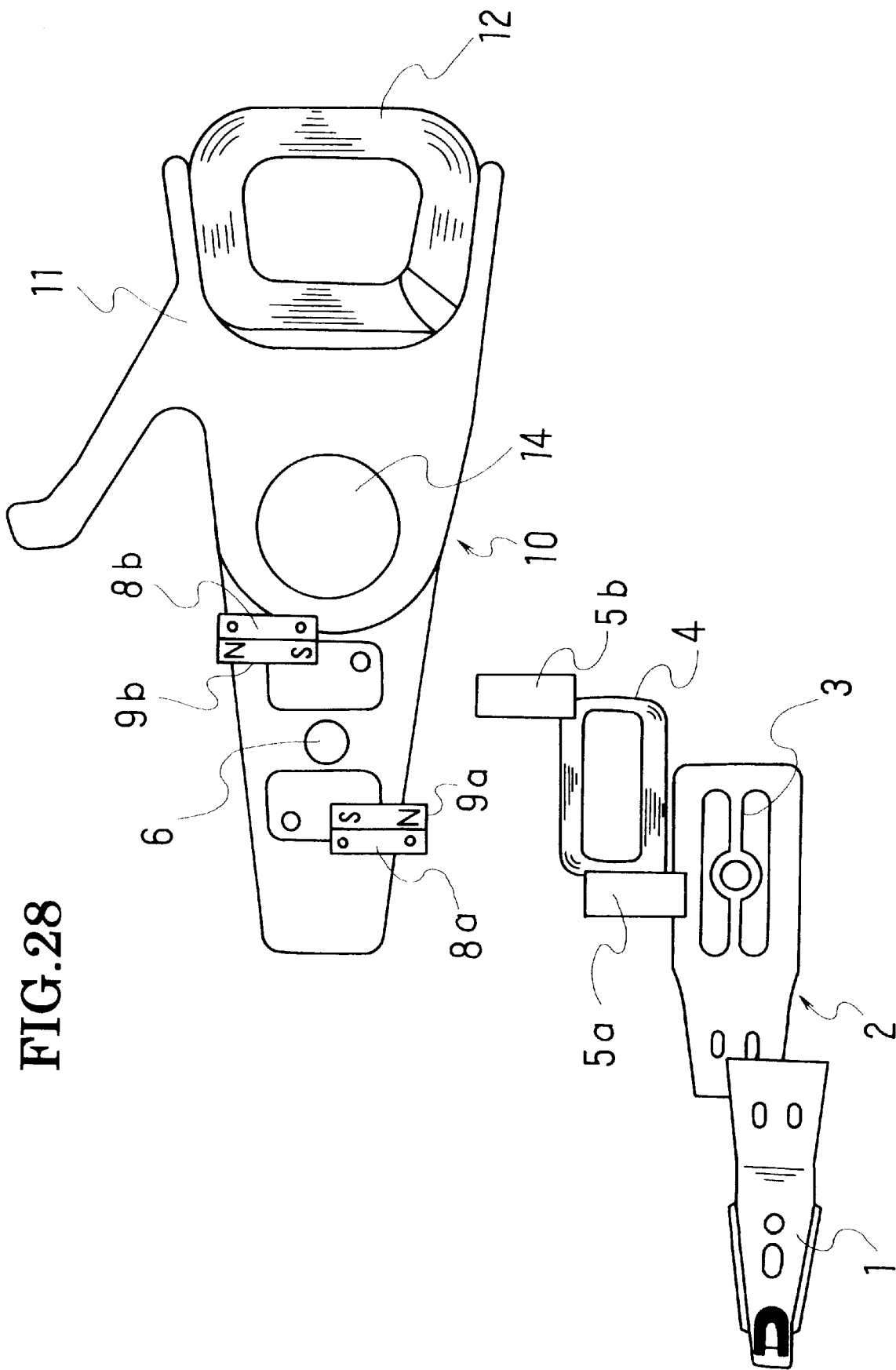

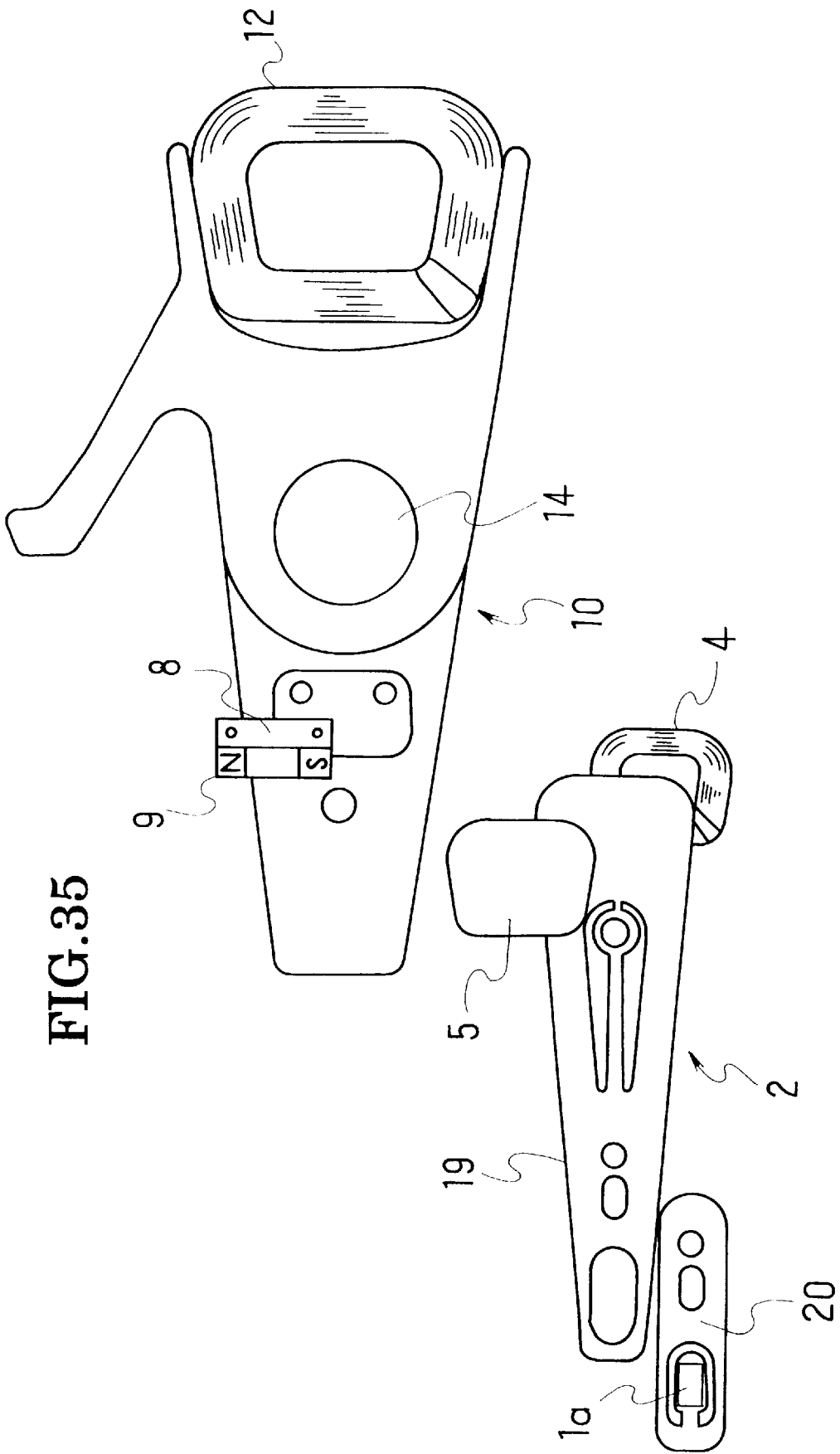

RECORDING/REPRODUCING HEAD POSITIONING MECHANISM

BACKGROUND OF THE INVENTION

The present invention relates to a recording/reproducing head positioning mechanism for a disc apparatus, such as a magnetic disc apparatus or an optical disc apparatus and, more particularly, to a small size, highly accurate magnetic head positioning mechanism, which is a two-stage actuator comprising a fine actuator including a head gimbal assembly with a magnetic head provided thereon at one end thereof, and a coarse actuator with the fine actuator supported thereon and secured thereto, and has satisfactory vibration characteristics free from main resonance up to a high frequency band and excellent response characteristics.

The recording density of the magnetic disc apparatus is increasing at a pase of 60% or above per year with increasing BPI (Bit Per Inch) and TPI (Track Per Inch).

For increasing the BPI, reduction of the head float-up, adoptation of high sensitivity magnetic heads such as MR (Magneto Resistive) heads and highly efficient signal processing techniques are required. To realizeTPI increase, it is an important additional technical subject to improve the accuracy of magnetic head positioning. For an example, while with a recording density of 1 Gb/in$^2$, the track density is 8 kTPI or below corresponding to 3 to 4 $\mu$m, for attaining the recording density of 10 Gb/in$^2$ the track density amounts to 25 kTPI or above corresponding to a track pitch of 1 $\mu$m or above. In this case, the accuracy of magnetic head positioning should be 0.1 $\mu$m or above (which is approximately 10% of the track pitch).

A magnetic head positioning mechanism (i.e., positioner) used in the prior art magnetic disc apparatus is shown in FIGS. 36 to 39. FIGS. 36($a$) and ($b$) are plan views showing the prior art magnetic head positioning mechanism, FIG. 36($a$) showing the apparatus in a stationary state, FIG. 36($b$) showing the apparatus during operation. FIG. 37 is a side view showing the magnetic head positioning mechanism shown in FIGS. 36($a$) and ($b$). FIG. 38 is a perspective view showing a head gimbal assembly in the magnetic head positioning mechanism shown in FIGS. 36($a$) and ($b$). FIG. 39 is a bottom view showing the same mechanism.

The prior art magnetic head positioning mechanism shown in these Figures is called rotary actuator system, in which a magnetic head is driven accurately. As shown in FIGS. 36($a$) and 36($b$), the mechanism comprises an arm block (or carriage) 113, which includes a plurality of holder arms 111 disposed one above another in the height direction and a movable coil 112 and is mounted on a bearing shaft 114 for rotation in the direction of arrow A.

As shown in FIG. 37, the arm block 113 includes a plurality of holder arms 111 disposed one above another in the height direction. As shown in FIGS. 38 and 39, to the free end of each holder arm 111 is connected a head gimbal assembly 101 (hereinafter abbreviated as HGA), which includes a float-up type or contact type slider 103 having a magnetic head 102, a gimbal spring 104 supporting the slider 103 and a load beam 105 providing a pushing force to the slider 103. The movable coil 112 is provided on the other end of the arm block 113. The movable coil 112 and an external stationary magnetic circuit 116 constitute voice coil motor (hereinafter abbreviated as VCM). When the movable coil 112 is energized by flowing a predetermined drive current through it, it generates a drive force to cause rotation of each holder arm 111 about the bearing shaft 114 so as to drive each HGA 101 along an arcuate orbit in seak directions (as shown by arrows A), thus positioning each head 102 to a desired track on the medium. By the term "positioning" is meant either a seak operation (or tracking) of moving the head from a given track position to a desired track position, or a follow operation (i.e., following) of following desired tracks with the head.

As shown above, in the prior art magnetic head positioning mechanism, a single VCM simultaneously drives a plurality of heads. Therefore, the accuracy of positioning, particularly the accuracy of track following in the following operation, is insufficient, and it is a trend of the mechanism that it is becoming increasingly difficult to apply it to high TPI apparatuses requiring small track pickes of 1 $\mu$m or below as noted above.

Recently, researches and investigations of commonly termed two-stage actuators having a drive mechanism for independently driving each head are being made in addition to and independently of arm block (i.e., carriage) driving by VCM.

The two-stage actuators are roughly classified into three kinds, as shown in FIG. 40, in dependence on independently driven parts, that is:

a head drive system in which a plurality of heads are driven independently (FIGS. 40($a$) and 40($b$)); a slider drive system in which a plurality of sliders are driven independently (FIGS. 41($a$) and 41($b$); and an HGA drive system in which a plurality of head gimbal assemblies (HGAS) are driven independently (FIGS. 42, 43($a$) and 42($b$)).

In the head drive system as shown in FIG. 40, an electrostatic drive type linear actuator 202 having a comb structure is buried in a slider 201 having a magnetic head 203 by utilizing micromachine techniques. In the Figure, designated at 204 is a load beam supporting the slider 201.

The slide drive system as shown in FIGS. 41($a$) and 41($b$), has a structure which is obtained by combining a silicone microgimbal 301 and a planar electromagnetic drive type piggyback microactuator 302. In the Figures, designated at 303 is a load beam, at 304 a slider, and at 305 an R/W amplifier/driver.

The HGA drive systems shown in FIGS. 42, 43($a$) and 43($b$) are sub-classified into a high stiffness type (FIG. 42) and a high compliance type (FIGS. 43($a$) and 43($b$)).

In the high stiffness type as shown in FIG. 42, a laminate piezoelectric element 402 is buried in an end portion of an arm block 401, and an HGA 404 is driven by a pair of parallel leaf springs 403.

This high stiffness type has advantages that a servo system can be readily constructed and that a small thickness, compact and high rigidity design is possible. In the Figure, designated at 405 is a movable coil, and at 406 a recording medium.

In the high compliance type as shown in FIGS. 43($a$) and 43($b$), a small VCM is constructed by disposing a small coil 503, a yoke 506 and permanent magnet 507 in a portion, in which an HGA 502 is connected. More specifically, the HGA 502 is connected to a holder arm 501, which is mounted on a shaft 504 which is in turn rotatably mounted in a cross spring 505. The HGA 502 is driven for rotation by electromgnetic forces of a VCM. This high compliance type is designed with the cross spring 505 disposed in a microactuator bearing part and bent 90 degrees with respect to a plane of driving, thus reinforcing advancement direction rigidity while sacrificing rotation (or drive) direction rigidity. A great drive stroke is thus obtainable with a relatively low current.

The prior art two-stage actuator techniques as described above, however, have the following problems. In the head drive system as shown in FIG. 40, in which the electrostatic drive linear actuator having the comb structure is buried in the slider, high machining accuracy is required. Therefore, the yield is inferior. In addition, ready displacement is caused by shocks exerted in the movement direction.

In the slide drive system as shown in FIGS. 41(*a*) or 42(*b*), it is impossible to set a sufficiently large thickness of coil pattern layer for generating induced magnetic field. Therefore, a sufficient drive force can riot be generated, and the system has not yet been in practical use.

As for the HGA drive systems, in the high stiffness type as shown in FIG. 42, although the system permits ready construction of a servo system and small thickness, compact and high rigidity design, a large current is necessary for driving the HGAs, thus leading to extreme deterioration (or rupture in the extreme case) due to changes in ambient conditions such as temperature.

In the high compliance type as shown in FIG. 43, the complicated bearing spring (i.e., cross spring) is undesired from the standpoint of the small size (or small thickness) design of the actuator part, and also poses problems in vibration characteristics, such as pronounced off-track resonance generated by a combination of advancement vibrations and rotational vibrations due to complicated spring structure.

SUMMARY OF THE INVENTION

The present invention has been proposed for solving the above problems inherent in the prior art, and has an object of providing, for a two-stage actuator magnetic disc apparatus which has satisfactory vibration characteristics free from actuator main resonance up to a high frequency band, excellent response and high recording density, particularly in excess of 10 Gb/in$^2$, a fast and highly accurate magnetic head positioning mechanism, which can follow small track pitches (of 1 $\mu$m or below) corresponding to track densities of 25 kTPI or above and ensure servo bands of 3 kHz or above.

According to the present invention, there is provided a magnetic head positioning mechanism constituted by a two-stage actuator comprising: a fine actuator including a head gimbal assembly with a magnetic head provided thereon at an end thereof; and a coarse actuator supporting the fine actuator secured thereto at one end thereof, the coarse actuator having a portion adjacent the other end rotatably supported on a shaft; the fine actuator having a spring frame and a spring member provided therein and extending toward the head gimbal mechanism, the spring member having an intermediate portion secured to a set pin member provided in and projecting from the coarse actuator, the fine actuator being thereby secured to and supported by the coarse actuator; a voice coil motor being provided between the fine and course actuators, the voice coil motor being constituted by a small coil, a yoke a permanent magnet; the spring member of the spring part being flexed by a drive force generated in the fine actuator with energization of the voice coil motor small coil caused by current application thereto, thereby causing slight rotation of the head gimbal assembly in the fine actuator.

The spring part of the fine actuator is constituted by a thin sheet-like frame and an I shape spring having a leaf spring provided in the frame. The spring member of the spring part consists of a pair of spring members disposed on the opposite sides of the set pin member, one of the pair spring members having a larger or smaller length than the other. The spring member having the larger length has increasing spring widths as one goes away from the set pin member.

The voice coil motor small coil is disposed on the side of the set pin member of the fine actuator opposite the head gimbal assembly. The small coil of the voice coil motor is constituted by a pair of small coils disposed on the opposite sides of and in the longitudinal direction of the spring member of the fine actuator. The small coil of the voice coil motor has a ring-like shape centered at the position of securement of the fine actuator by the set pin member such as to enclose the spring member. The voice coil motor is disposed on the side of the spring part frame opposite the small coil. The yoke of the voice coil motor is integral with the set pin member for securing the spring member, the yoke being secured to the set pin member separately from and independently of the fine actuator. The fine actuator and the head gimbal mechanism are integral with each other.

In the magnetic head positioning mechanism, the fine actuator and the head gimbal assembly are integral with each other; and at least either a gimbal spring carrying a slider supporting the magnetic head of the head gimbal assembly or the spring member of the fine actuator entirely or partly has a reduced thickness.

In the magnetic head positioning mechanism, the fine actuator and the head gimbal assembly are integral with each other; and a gimbal spring carrying a slider of the head gimbal assembly is provided separately from a member, by which the fine actuator and the head gimbal assembly are made integral.

In the magnetic head positioning mechanism having the above construction according to the present invention, in addition to a prior art coarse actuator forming a VCM by combining a movable coil, which is provided at one end of an arm block including a plurality of holder arms, with an external stationary magnetic circuit such that the movable coil is energized by applying a predetermined drive current thereto, a small magnetic circuit is buried in an end of each holder arm of the arm block, and a fine actuator having a small coil, a yoke and leaf springs are disposed above the small size magnetic circuit.

Also, the small coil is energized by applying a predetermined current thereto to generate slight drive force so as to cause flexing of a leaf spring secured by a set pin member to the fine actuator, thus driving an HGA of the fine actuator for independent positioning control of each head. It is thus possible to obtain highly accurate following of tracks.

With the two-stage actuator thus constructed, which comprises a coarse actuator for collectively driving the entire arm block for the seek operation, and one or more fine actuators provided on the coarse actuator for the follow operation by slightly driving the HGA, it is possible to realize a highly accurate positioning mechanism even with a small track pitch of 1 $\mu$m or below.

The leaf spring of the fine actuator is constituted by a pair of I shape springs extending along the longitudinal center line of the fine actuator and having different lengths on the opposite sides of set pin member.

It is thus possible to provide a support spring having high planar advancement rigidity and low rotation rigidity, obtain satisfactory vibration characteristics free from resonance peak up to a high frequency band and realize a magnetic head positioning mechanism having excellent response characteristics.

In addition, by providing, as the leaf spring of the fine actuator, a pair of parallel leaf springs extending along the longitudinal center line of the fine actuator and on the opposite sides of the set pin member and providing a pair of small coils and yokes at the opposite ends of the leaf springs, two small VCMs are formed to apply rotational torque about the set pin member position to the pair of parallel leaf springs, thus slightly driving the HGA for the follow operation.

In the driving the coarse actuator the two small coils are energized by applying 180-degree out-of-phase currents thereto to generate opposed drive torques on the opposite sides of the leaf springs, thus securing the fine actuator to the coarse actuator and ensuring sufficient planar advancement rigidity. It is thus possible to obtain satisfactory vibration characteristics free from resonance peak up to a high frequency band.

Other objects and features will be clarified from the following description with reference to attached drawings.

BRIEF DESCRIPTION OF THE DRAWINGS

FIG. 7 is a graph illustrating the influence of yoke mass on actuator vibration characteristics in the embodiment;

FIGS. 12(a), 12(b) and 13 to 15 are a fragmentary enlarged-scale plan view showing the third embodiment of the magnetic head positioning mechanism;

FIG. 14 is a fragmentary sectional view of the same;

FIG. 15 is an exploded plan view showing the third embodiment of the magnetic head positioning mechanism;

FIGS. 26 to 28 are a plan view and a fragmentary ex view and an exploded plan view showing a sixth embodiment of magnetic head positioning mechanism;

FIGS. 33 to 35 are a plan view, a fragmentary sectional view and an exploded perspective view showing an eighth embodiment of the magnetic head positioning mechanism according to the present invention;

PREFERRED EMBODIMENTS OF THE INVENTION

Preferred embodiments of the present invention will now be described with reference to the drawings.

A first embodiment of the magnetic head positioning mechanism according to the present invention will now be described referring to FIGS. 1 to 11.

Figure 1:
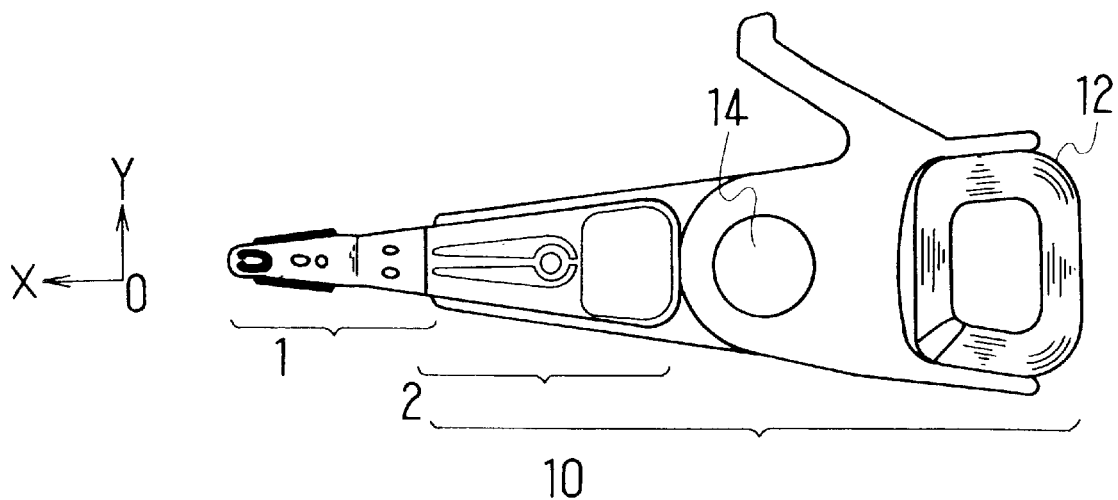
FIGS. 1 to 4 are a plan view, a side view, a fragmentary enlarged-scale sectional view and an exploded plan view showing a first embodiment of the magnetic head positioning mechanism according to the present invention.
Figure 2:
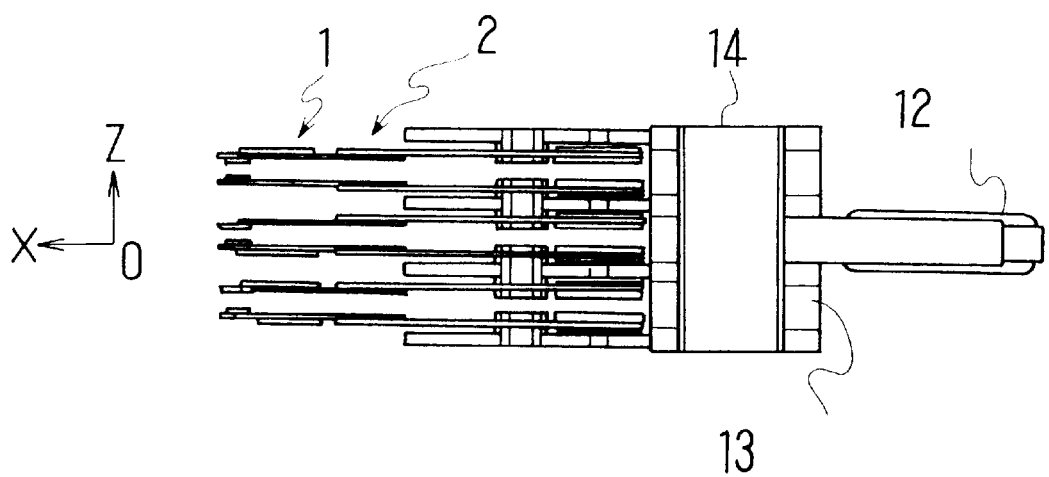
Figure 3:
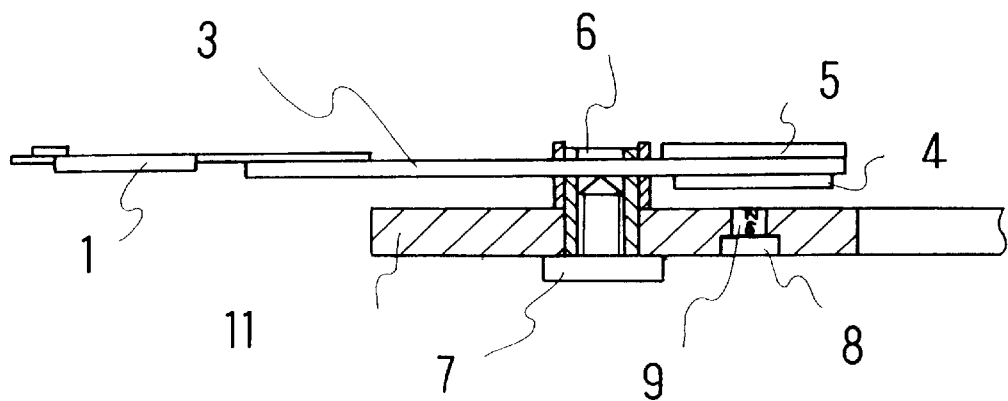
Figure 4:
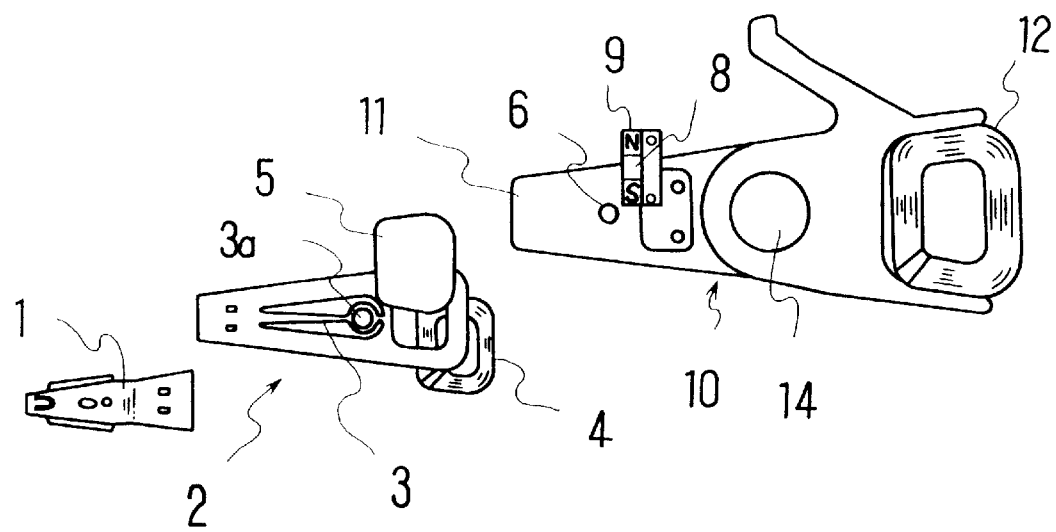
Figure 5A:
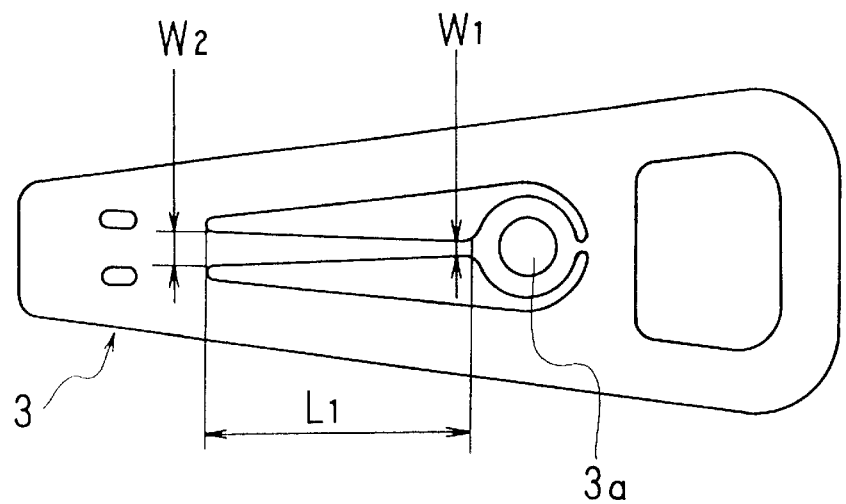
FIGS. 5(a) and 5(b) are views showing a spring part of a fine actuator in the embodiment in detail.
Figure 5B:
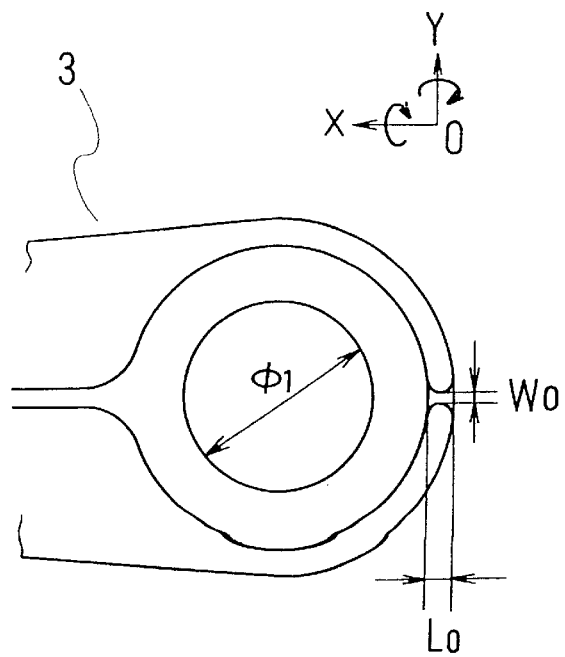
Figure 6A:
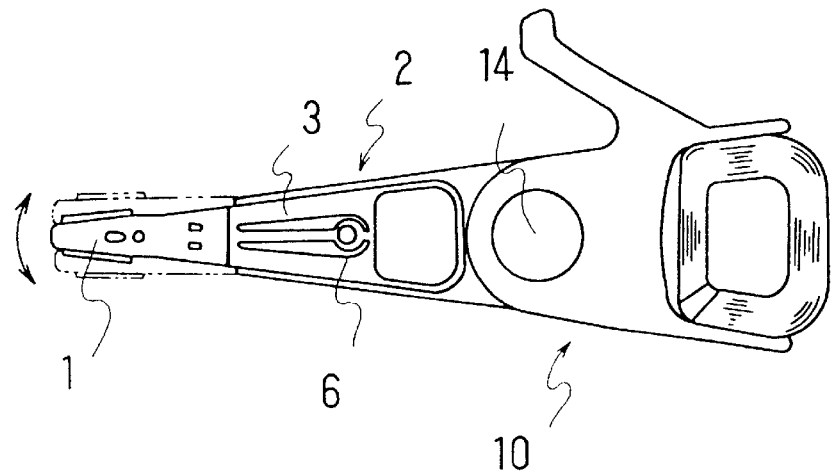
FIGS. 6(a) and 6(b) are views for describing the operation of the embodiment of the magnetic head positioning mechanism.
Figure 6B:
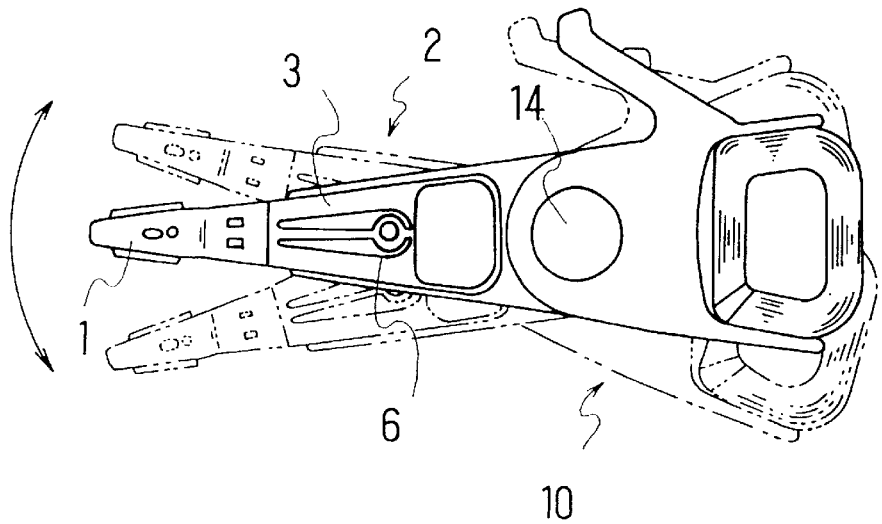
Figure 8A:
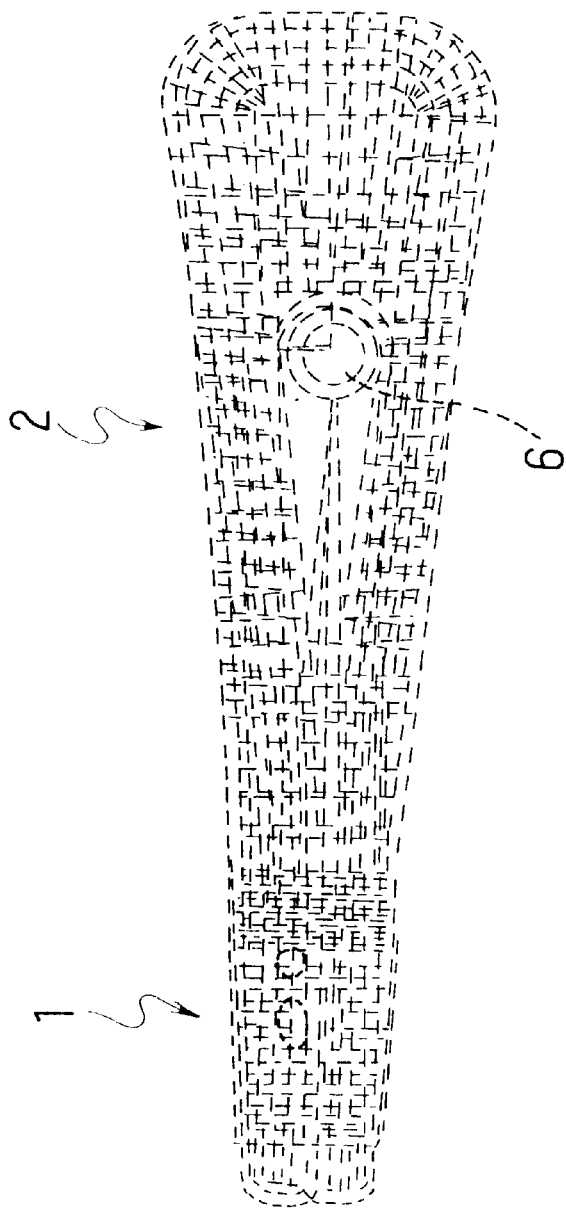
FIGS. 8(a) and 8(b) are views illustrating main vibration modes of the embodiment.
Figure 8B:
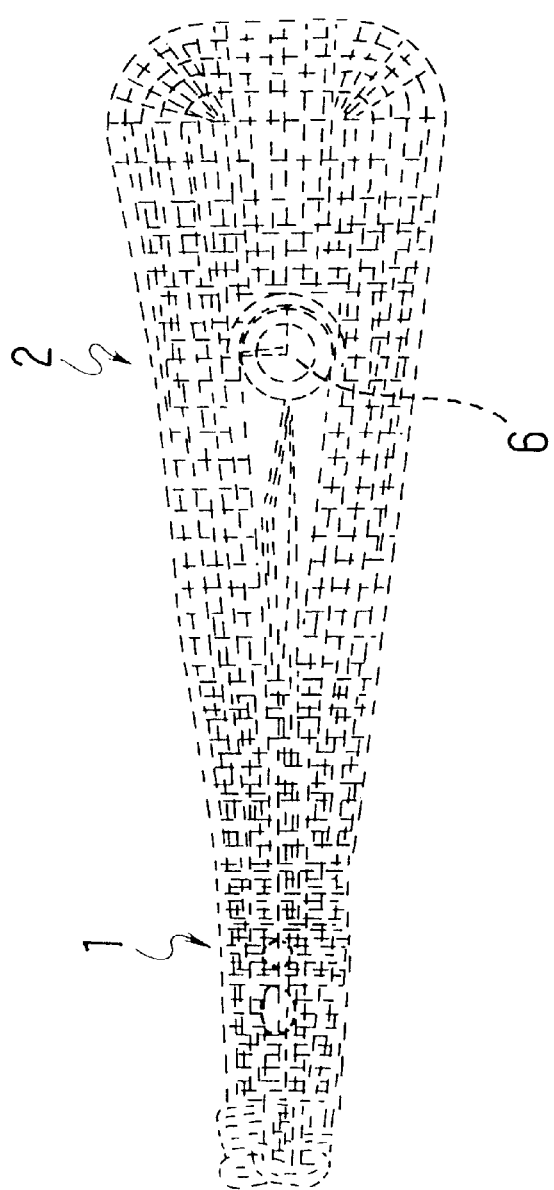
Figure 9:
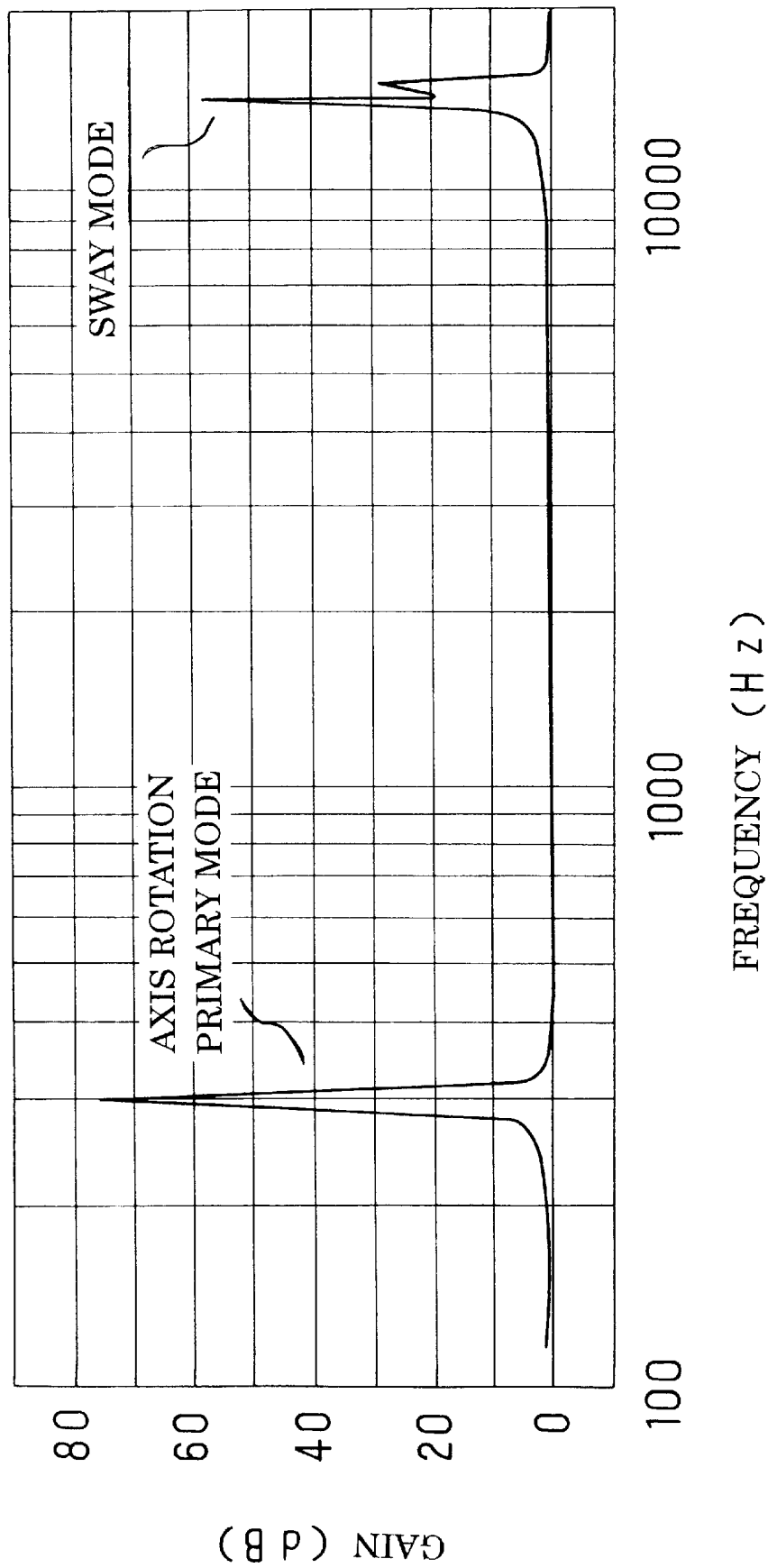
FIGS. 9, 10(a) and 10(b) are graphs showing vibration characteristics of the embodiment.
Figure 10A:
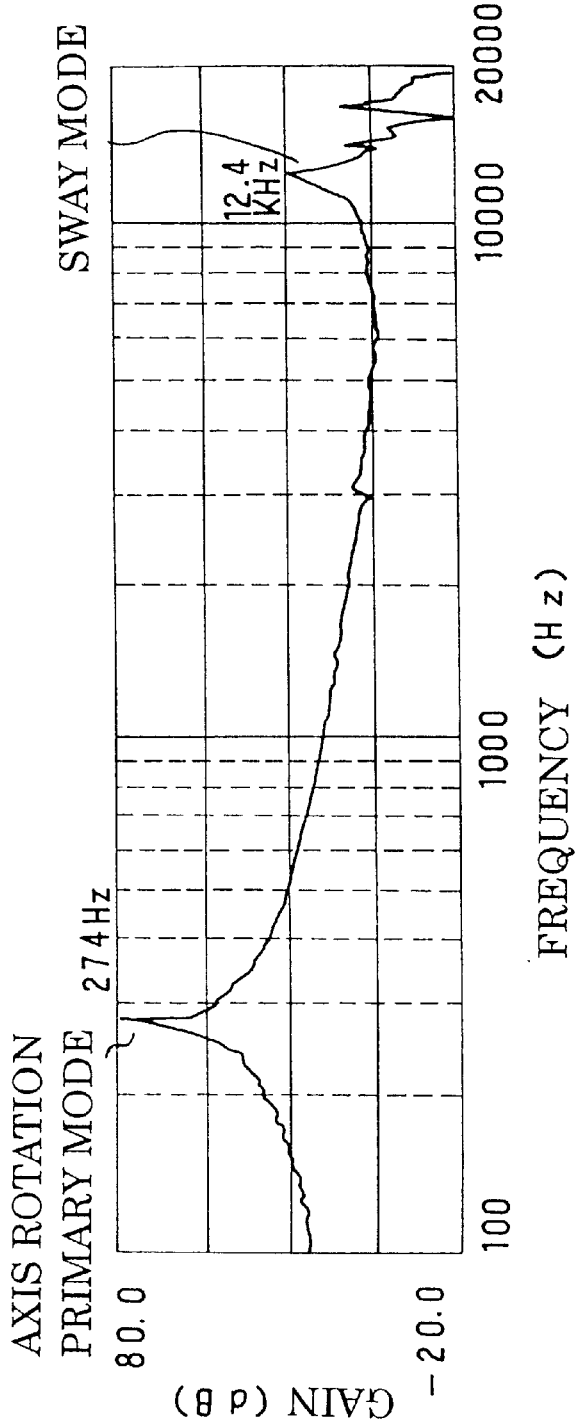
Figure 10B:
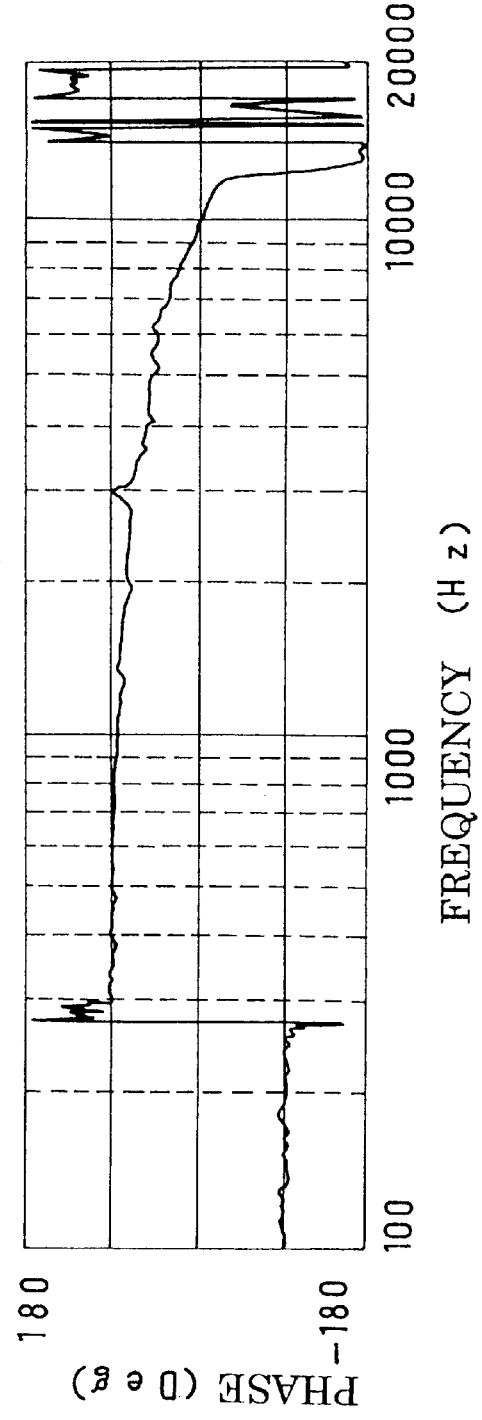
Figure 11:
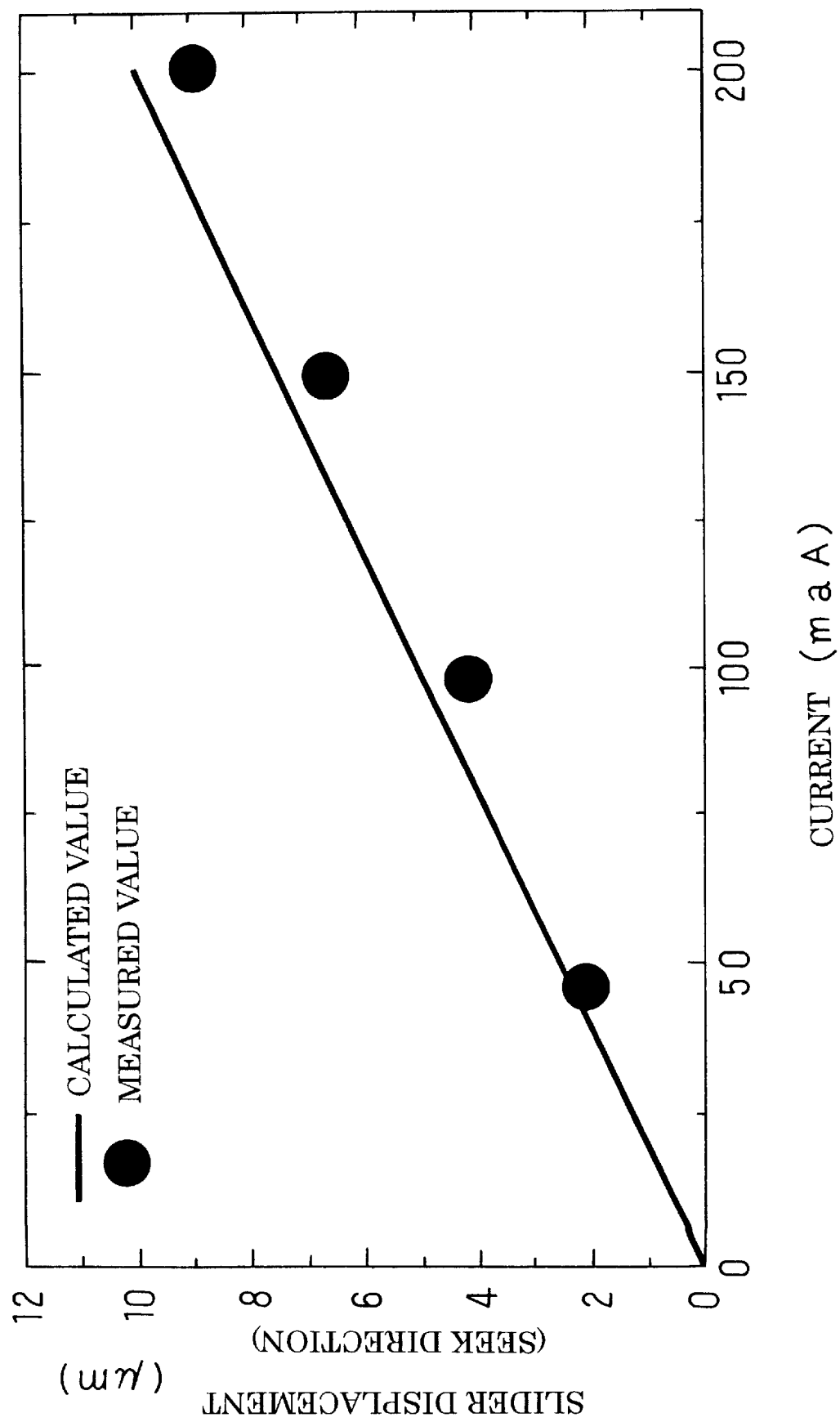
FIG. 11 is a graph showing the relation between displacement of fine actuator and drive current applied to small coil in the embodiment.

FIG. 1 is a plan view showing the embodiment of the magnetic head positioning mechanism, FIG. 2 is a side view showing the same; FIG. 3 is a fragmentary enlarged-scale sectional view showing the same; and FIG. 4 is an exploded plan view showing the same. FIGS. 5(a) and 5(b) are views showing a spring part of a fine actuator in the embodiment in detail, FIG. 5(a) being a plan view, FIG. 5(b) being a fragmentary enlarged-scale plan view. FIGS. 6(a) and 6(b) are views for describing the operation of the embodiment of the magnetic head positioning mechanism, FIG. 6(a) illustrating a track follow operation, FIG. 6(b) illustrating a seek operation. FIG. 7 is a graph illustrating the influence of yoke mass on actuator vibration characteristics in the embodiment. FIGS. 8(a) and 8(b) are views illustrating main vibration modes of the embodiment. FIGS. 9, 10(a) and 10(b) are graphs showing vibration characteristics (determined by tests by simulation and with actual machines) of the embodiment. FIG. 11 is a graph showing the relation between displacement of fine actuator and drive current applied to small coil in the embodiment.

As shown in these Figures, the first embodiment of the magnetic head positioning mechanism according to the present invention constitutes a two-stage actuator, which comprises a plurality of head gimbal assemblies (HGAs) each including a slider with a magnetic head mounted thereon, fine actuators 2 for finely driving the HGAs 1, and a coarse actuator 10 for collectively driving the HGAs and fine actuators.

The present invention features that a holder arm part of the magnetic head positioning mechanism is constituted by a small size, high accuracy two-stage actuator, the remainder of the structure being substantially the same as the magnetic head positioning mechanism shown in FIGS. 36 to 39.

The HGA 1 in this embodiment, although not shown in detail, has substantially the same structure as the HGA 101 in the prior art magnetic head positioning mechanism shown in FIGS. 36 to 39. Specifically, the HGA 1 includes a floating or contact type slider having a magnetic head, a gimbal spring part supporting the slider, and a load beam part for applying a pushing force to the slider, and it is connected to the associated fine actuator 2 such that the slider faces the recording medium.

The fine actuator 2 includes an I shape spring 3 formed from a thin steel sheet, a small coil 4 and a yoke 5. The I shape spring 3 extends in the longitudinal direction of the fine actuator, i.e., it extends toward the HGA 1, and has a caulking part 3a provided in its intermediate portion.

More specifically, the I shape spring 3 of the fine actuator 2 has a pair of I shape leaf springs (I shape springs) disposed on the opposite sides of the caulking part 3a in the longitudinal direction of the fine actuator 2. As shown in FIG. 3, the caulking part 3a is fitted in and secured to a set pin member 7 penetrating a holder arm 11 of the coarse actuator 10 (caulking position shown in FIG. 3). The fine actuator 2 is thus secured to the holder arm 11 entirely by the set pin member 7. Of the pair of leaf springs of the I shape spring 3, one has a large spring length compared to the other, and also has increasing spring widths as one goes away from the caulking position.

Specifically, as shown in FIGS. 5(a) and 5(b), the I shape spring 3 of the fine actuator 2 has a pair of I shape leaf springs extending on the opposite sides of the caulking part 3a in the longitudinal direction of the fine actuator 2. Of these leaf springs the one on the side of the small coil 4 has a small spring length (L0) and a small spring width (substantially equal to the thickness of the I shape spring 3, i.e., W0=100 to 200 $\mu$m). The other leaf spring has a large spring length (L1), and has increasing spring widths as one goes from the caulking position 6 toward the HGA 1 (W1<W2 in FIG. 5).

With the leaf springs of the I shape spring 3 in the above constitution, it is possible to design the spring such that the leaf springs are flexed by the drive force generated by the small coil 4 such that the rigidity against rotation is reduced to permit a sufficient rotational displacement to be obtained with a predetermined drive force and that the rigidity against advancement is increased to eliminate structural resonance in the seek direction up to a high frequency. It is thus possible to permit fast accessing. In the I shape spring 3, if the diameter of the caulking art 3a ($\phi$1 in FIG. 5(b)) which is fitted on and secured to the set pin member 7 in the caulking position 6 is too large, the rigidity against rotation of the fine actuator 2 would be too high to obtain sufficient displacement/follow performance. If the diameter is small, on the other hand, Z-height error may be caused by an initial pitch variation since the outer planer direction rigidity (pitch/roll rigity) about the fixed axis of the fine actuator 2 is low.

The diameter of the set pin member 7 is thus desirably set to provide a pitch/roll rigidity such that the pin secured part is sufficiently rigid against the pushing force generated in the HGA 1, or pulling force exerted to yoke 5 by permanent magnet 9 of the coarse actuator 10 to be described later, or external disturbances such as externally exerted shocks.

From the above standpoint, the I shape spring 3 itself is ideally such that the bending rigidity in the direction of arrow Y is sufficiently rigid compared to the bending rigidity in the direction of arrow Z, and it is desirable to design the I shape spring 3 such that its thickness is large and its width (W0, W1) is small.

In this embodiment, the spring part of the fine actuator 2 has a thin sheet-like spring frame and the I shape spring 3 constituted by the leaf springs provided in the frame. However, the spring part may have any other structure as well. More specifically, the spring part may be of any other structure than an I shape spring so long as it has a spring frame and a spring member, which is provided therein such as to extend toward the HGA 1 and has a longitudinally intermediate portion secured to the set pin member 7 projecting from the coarse actuator 10.

The small coil 4 which is disposed in the fine actuator 2 in the form of a thin steel sheet, is secured at a position on the side of the caulking part 6 of the fine actuator 2 opposite the side thereof in connection to the HGA 1. The yoke 5 is secured to the steel sheet constituting the I shape spring 3 on the side of the steel sheet opposite the small coil 4. That is, the yoke 5 and the small coil 4 are mounted on the side of the caulking position 6 of the set pin member 7 opposite the HGA, and the yoke 5 is mounted on the side of the steel sheet of the I shape spring 3 opposite the small coil 4 (see FIG. 3).

In the case of an apparatus designed such that the Z-height is small, however, the yoke 5 may be provided on the side of the coil (i.e., between the small coil 4 and the steel sheet of the I shape spring 3).

The latter mounting method in which the yoke and the magnet are closely spaced apart, permits setting a high drive force that is generated. In this case, however, permanent magnet 9 of the coarse actuator 10 to be described later will provide a considerably high yoke attracting force, and initial pitch bias may possibly be brought about. It is thus desirable to adopt the former mounting method in case where it is impossible to set a sufficiently high pitch rigidity around the set pin member of the fine actuator 2. The coarse actuator 10 is constituted by an arm block (or carriage) 13, which has a plurality of holder arms 11 provided at one end and a movable coil 12 provided at the other end.

The coarse actuator 10 is combined with an external stationary magnetic circuit (not shown) to assemble a large VCM. The movable coil 12 is energized by applying a predetermined drive current to it to generate a drive force, thus driving the arm block 13 about a shaft bearing 14 for seeking (or tracking) operation. Each holder arm 11 of the coarse actuator 10 has a buried yoke base 8, which constitutes a magnet assembly together with a pair of permanent magnets 9 secured to it.

As shown in FIG. 4, the two permanent magnets 9 are secured to the yoke base 8 with their N and S poles directed toward the recording medium. As shown in FIG. 3, the whole magnet assembly is buried in a portion of the holder arm 11 corresponding to the small coil 4 in the fine actuator 2, and forms a closed magnetic circuit together with the yoke 5 in the fine actuator 2. The magnet assembly constitutes a small magnetic circuit (i.e., VCM) together with the small coil 4 and the yoke 5 in the fine actuator 2, for generation of a drive force by energizing of the small coil 4 with current application thereto.

As will be described later, the drive force generated by the small VCM causes flexing of the I shape spring 3 to cause rotation of the fine actuator 2 about the caulking position 6, thus causing a fine displacement of the HGA 1 for the track following operation of the head.

In this embodiment, as the magnetic material of the yoke 5 in the fine actuator 2 is usually used fixed carbon steel (of "S10C" to "S30C") from considerations of the compromise with cost and so forth. In cases as in this embodiment where the yoke is directly connected to the fine actuator 2 itself as drive, the less the mass of the yoke the main resonance is shifted to the higher frequencies, and it is possible to suppress the vibration amplitude the more.

FIG. 7 shows calculated transfer characteristics of this embodiment obtained by varying the mass (i.e., thickness) of the fine actuator yoke. In the graph, the ordinate is taken for the response of the head position to the set pin member, and the abscissa is taken for the frequency (in linear representation). FIGS. 8(*a*) and 8(*b*) are views showing main vibration modes of this embodiment of the magnetic head positioning mechanism.

As is seen, primary mode of vibrations of rotation (FIG. 8(*a*)) appears around 300 Hz, and main resonance of actuator (FIG. 8(*b*)) appears at 12 to 14 kHz. It will be seen that shifting of main resonance to high frequencies and more suppression of resonance gain are obtained by reducing the yoke mass (or thickness).

FIGS. 9, 10(*a*) and 10(*b*) show fine actuator vibration characteristics obtained by simulation (FIG. 9) and testing with actual machines (FIGS. 10(*a*) and 10(*b*)) using (fixed carbon steel) yoke cross-sectional dimensions (width and thickness) calculated from magnetomotive force models.

While in this case the primary mode of vibrations of rotation appears around 270 Hz and the main resonance at 12.4 kHz, it is possible to further improve the vibration characteristics if the yoke weight can be reduced by using high magnetic permeability materials, such as electromagnetic soft iron ("F2") or Permenjoule ("PR"), in lieu of low carbon steel.

In this embodiment, the small coil 4 is formed by using ordinary enamel-clad copper wire. The turns number and wire diameter (or upper limit of applicable current) are determined according to the necessary drive force.

FIG. 11 shows slider displacement obtained by operating actual machines and also by calculations, plotted against DC current applied through the small coil 4 in the fine actuator of the embodiment. As is shown, the slider is displaced linearly with increasing applied current, and a displacement of about 10 $\mu$m is obtained with an applied current of 200 mA.

In the embodiment of the magnetic head positioning mechanism having the above construction, in the seek operation (tracking) as shown in FIG. 6, the movable coil 12 mounted in the coarse actuator 10 is energized by applying a current thereto to generate driving torque from the VCM, which is combined with an external stationary magnetic circuit (not shown), thus collectively driving the arm block (or carriage) 13 comprising a plurality of sets each of the fine actuator 2 and the holder arm 11 (this state being shown in FIG. 6(*b*)).

In the follow operation (following), the small coil 4 mounted in each fine actuator 2 is energized by applying a current thereto to generate a drive torque in a small VCM, which is combined with a magnetic circuit buried in the coarse actuator 10, thus finely driving the HGA to follow a desired track with the head (this state being shown in FIG. 6(*a*)).

As shown above, in this embodiment of the magnetic head positioning mechanism, the movable coil 12 is provided at one end of the arm block 13 having a plurality of holder arms 11, and constitutes the VCM in combination with the external stationary magnetic circuit, for its energization by application of a predetermined current to it to generate drive torque, which is coupled to the coarse actuator 10 for head positioning operation by driving the entire arm block 13. The holder arms 11 of the arm block 13 each have a small magnetic circuit buried in an end portion, and the fine actuator 2 having the small coil 4, the yoke 5 and the I shape spring 3 are disposed above the small magnetic circuit.

By applying a predetermined current the small coil 4 is energized to generate a slight drive torque and cause flexing of the I shape spring 3 secured by the set pin member to the fine actuator 2, thus drive the HGA 1 connected to the fine actuator 2 for independent head positioning control. In this way, it is possible to obtain highly accurate follow operation (following).

A two-stage actuator thus can be provided, which comprises the coarse actuator 10 for collectively driving the entire arm block 13 and a plurality of fine actuators 2 provided on the coarse actuator 10 and each having the HGA 1 for being driven finely for the follow operation. It is thus possible to realize a highly accurate positioning mechanism, which is capable of positioning the head even with a small track pitch of 1 $\mu$m or below.

Figure 12A:
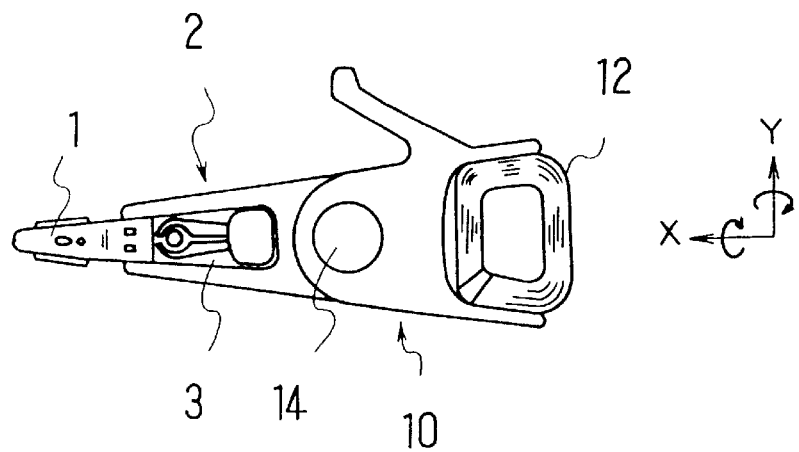
FIG. 12(a) is a plan view of the second embodiment of the magnetic head positioning mechanism.
Figure 12B:
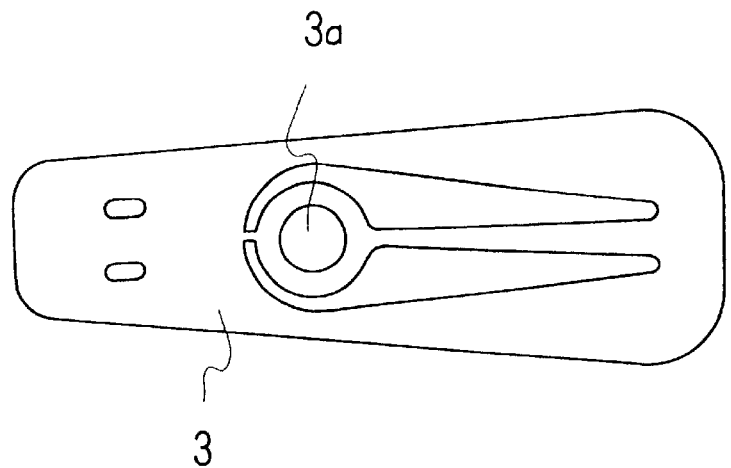
FIG. 12(b) is an enlarged scale plan view showing an I shape spring of a fine actuator in the second embodiment.

A second embodiment of the magnetic head positioning mechanism according to the present invention will be described with reference to FIGS. 12(*a*) and 12(*b*). FIG. 12(*a*) is a plan view showing the entire two-stage actuator, and FIG. 12(*b*) is an enlarged-scale plan view showing an I shape spring of a fine actuator.

As shown in these Figures, in this embodiment of the magnetic head positioning mechanism, unlike the first embodiment, the I shape spring 3 of the fine actuator 2 is provided such that its short leaf spring is on the side of the caulking position 6 nearer the HGA 1 and its long leaf spring nearer the small coil 4.

The lengths and widths of the leaf springs are the same as those in the first embodiment. The long leaf spring, however, partly (or entirely) overlaps the small coil 4 as shown. With this construction of the magnetic head positioning mechanism in this embodiment, the fine actuator 2 can be designed to be very compact, although the rotation rigidity in the driving direction is slightly increased compared to the first embodiment.

The embodiment is thus effective for a mechanism, for which a reduced size design of the drive part is required although the drive displacement may be small.

A third embodiment of the magnetic head positioning mechanism according to the present invention will now be described with reference to FIGS. 13 to 17.

Figure 13:
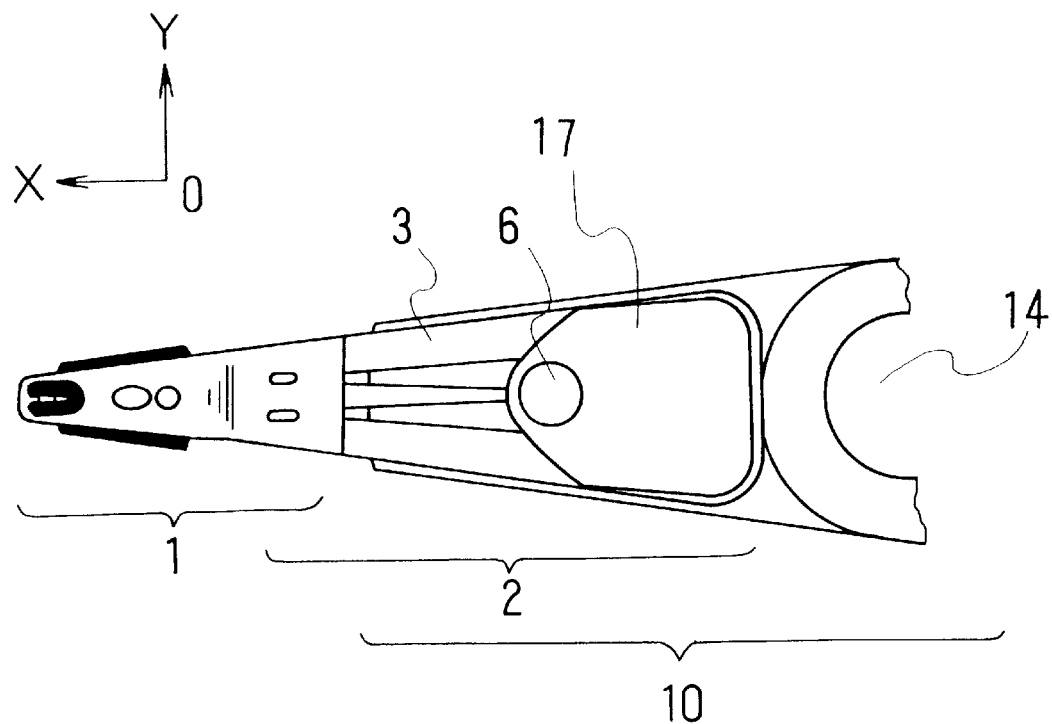
Figure 14:
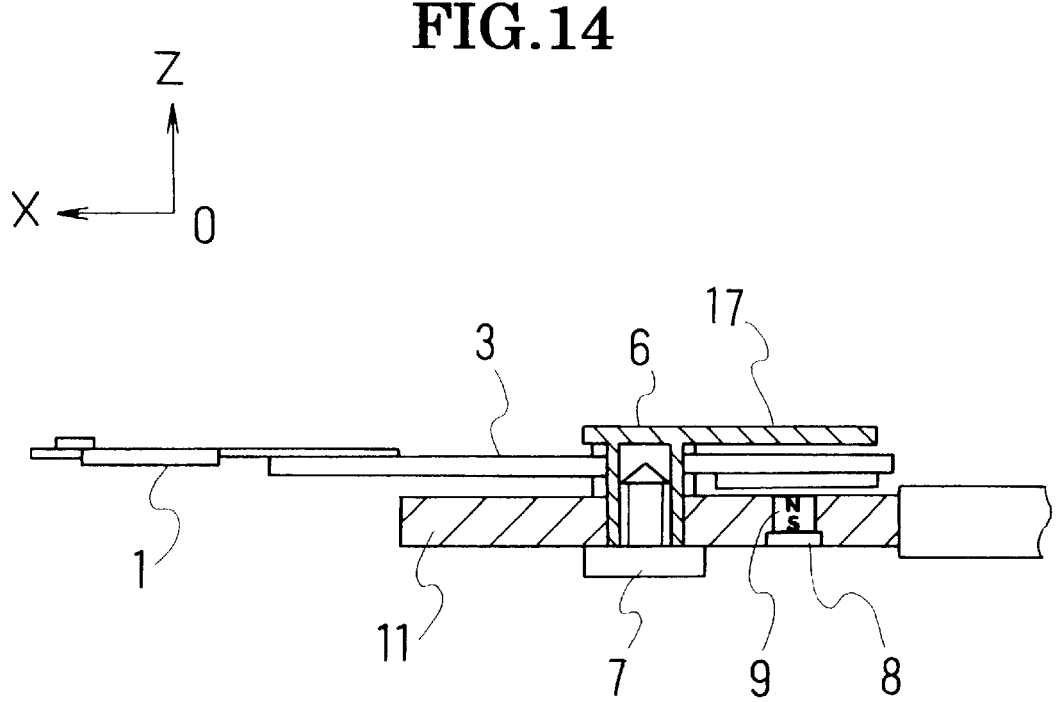
Figure 15:
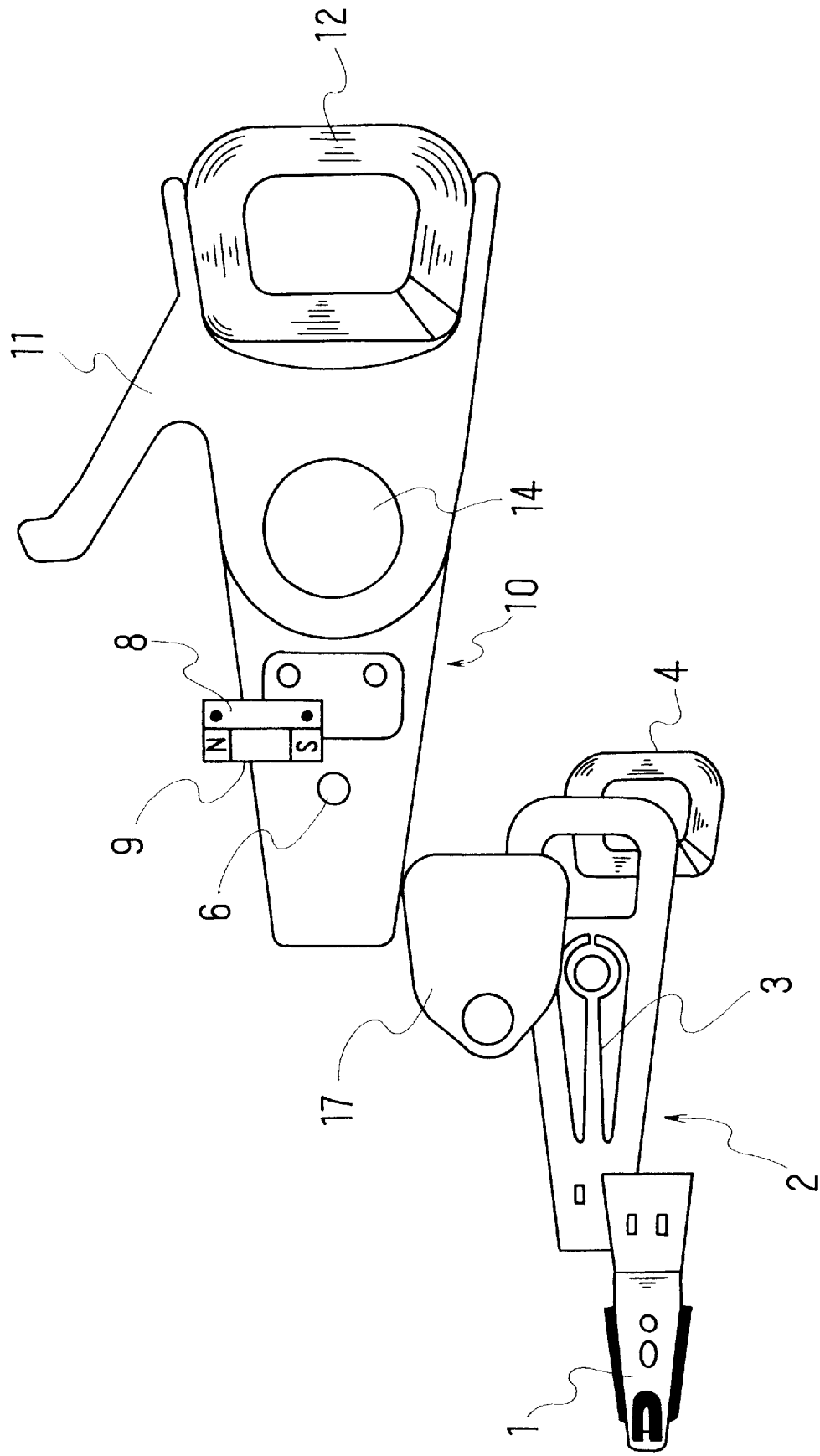
Figure 16A:
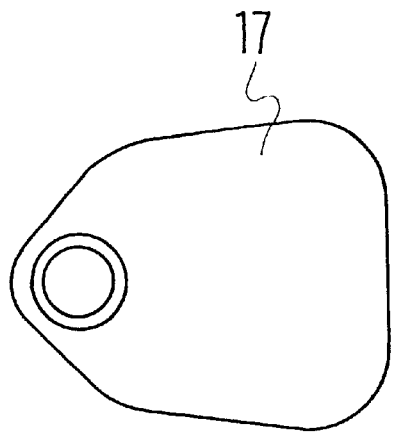
FIGS. 16(a) and 16(b) show a stationary yoke with integral caulking part in this embodiment.
Figure 16B:
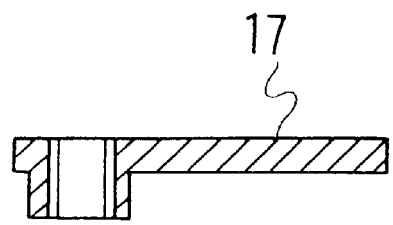
Figure 17:
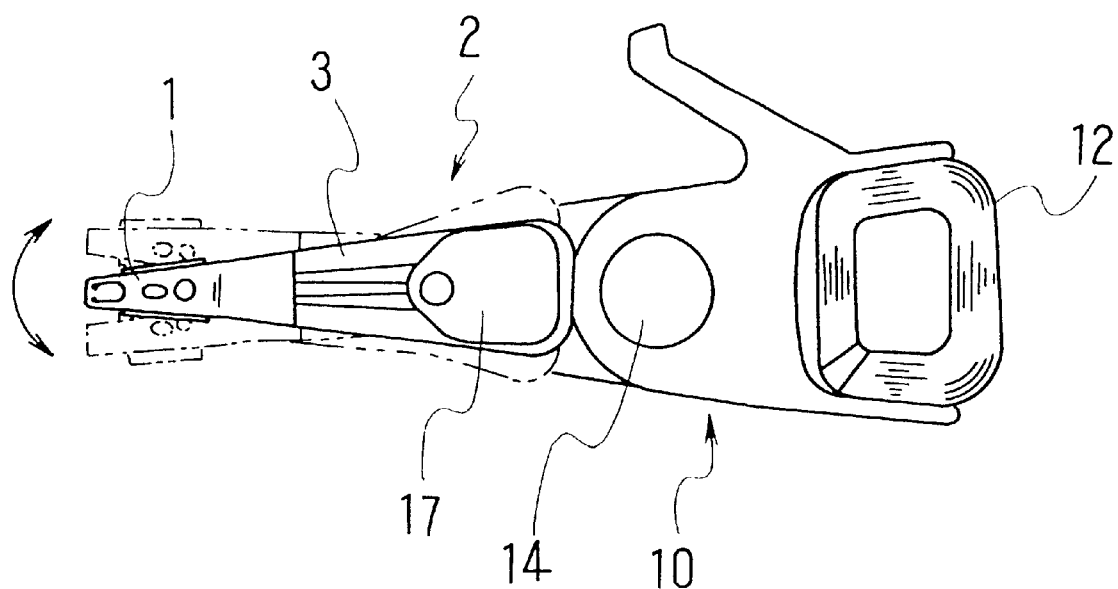
FIG. 17 is a view for describing the operation of the third embodiment of the magnetic head positioning mechanism, and shows the mechanism in a follow operation.

FIG. 13 is a fragmentary enlarged-scale plan view showing the third embodiment of the magnetic head positioning mechanism, FIG. 14 is a fragmentary sectional view of the same, and FIG. 15 is an exploded plan view of the same. FIGS. 16(*a*) and 16(*b*) show a stationary yoke with integral caulking part in this embodiment, FIG. 16(*a*) being a plan view, FIG. 16(*b*) being a sectional view. FIG. 17 is a view for describing the operation of the third embodiment of the magnetic head positioning mechanism, and shows the mechanism in a follow operation.

As shown in these Figures, in this embodiment of the magnetic head positioning mechanism, instead of the yoke 5 of the fine actuator 2 in the two-stage actuator in the previous first embodiment, a stationary yoke 17 has an integral caulking part, which serves as a shaft to secure the fine actuator 2 to the coarse actuator 10. That is, the stationary yoke 17 with the integral caulking part is disposed separately from and independently of the fine actuator 2, which is driven about the set pin member 7. The embodiment thus features that the yoke 17 is always secured to the coarse actuator 10 at the caulking position 6 even during operation of the fine actuator 2. More specifically, in this embodiment, instead of the yoke 5 in the first embodiment, which is directly connected to the steel sheet of the I shape spring 3 in the fine actuator 2 for closing the magnetic circuit, the stationary yoke 17 with the integral caulking part secured to the set pin member 7, as shown in FIGS. 3 and 4, is secured in the caulking position separately from and independently of the fine actuator 2.

In this embodiment the fine actuator 2 is constituted solely by the HGA 1, the I shape spring 3 and the small coil 4, and the fine actuator 2 is released from the mass of the yoke. It is thus possible, as described before in connection with the previous first embodiment, to improve the vibration characteristic of the fine actuator 2 without reduction of the drive torque due to magnetic flux density reduction (or flux leakage), thus shifting the main resonance to a higher frequency and suppressing the vibration amplitude, as well as expanding the actuator servo band and reducing the movement of inertia during driving. With this embodiment permits constructing the fine actuator 2 to be excellent in response characteristics.

A fourth embodiment of the magnetic head positioning mechanism according to the present invention will now be described with reference to FIGS. 18 to 22(a) to 22(c).

Figure 18:
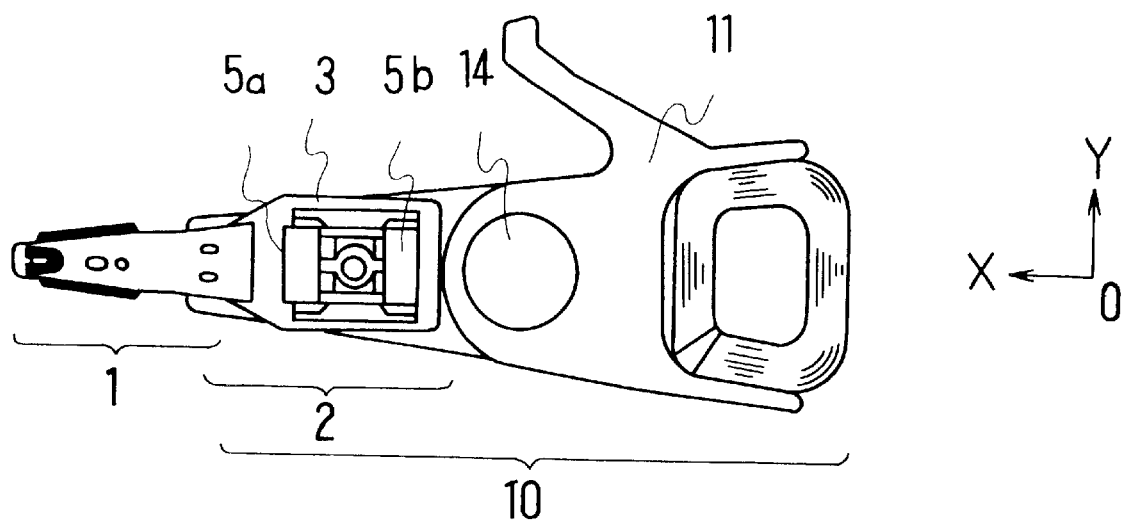
FIGS. 18 to 20 are a plan view, a fragmentary sectional view, and an exploded perspective view showing a fourth embodiment of the magnetic head positioning mechanism according to the present invention.
Figure 19:
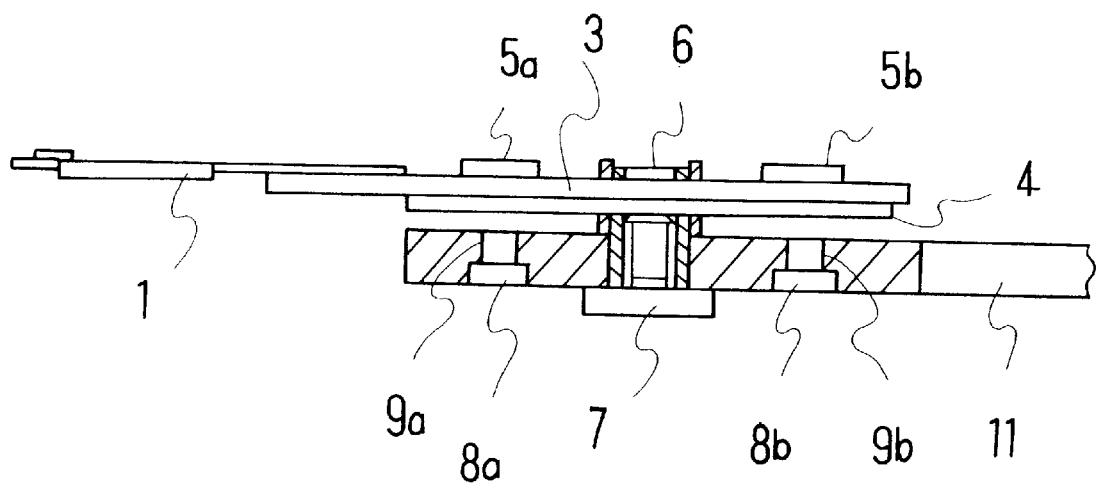
Figure 20:
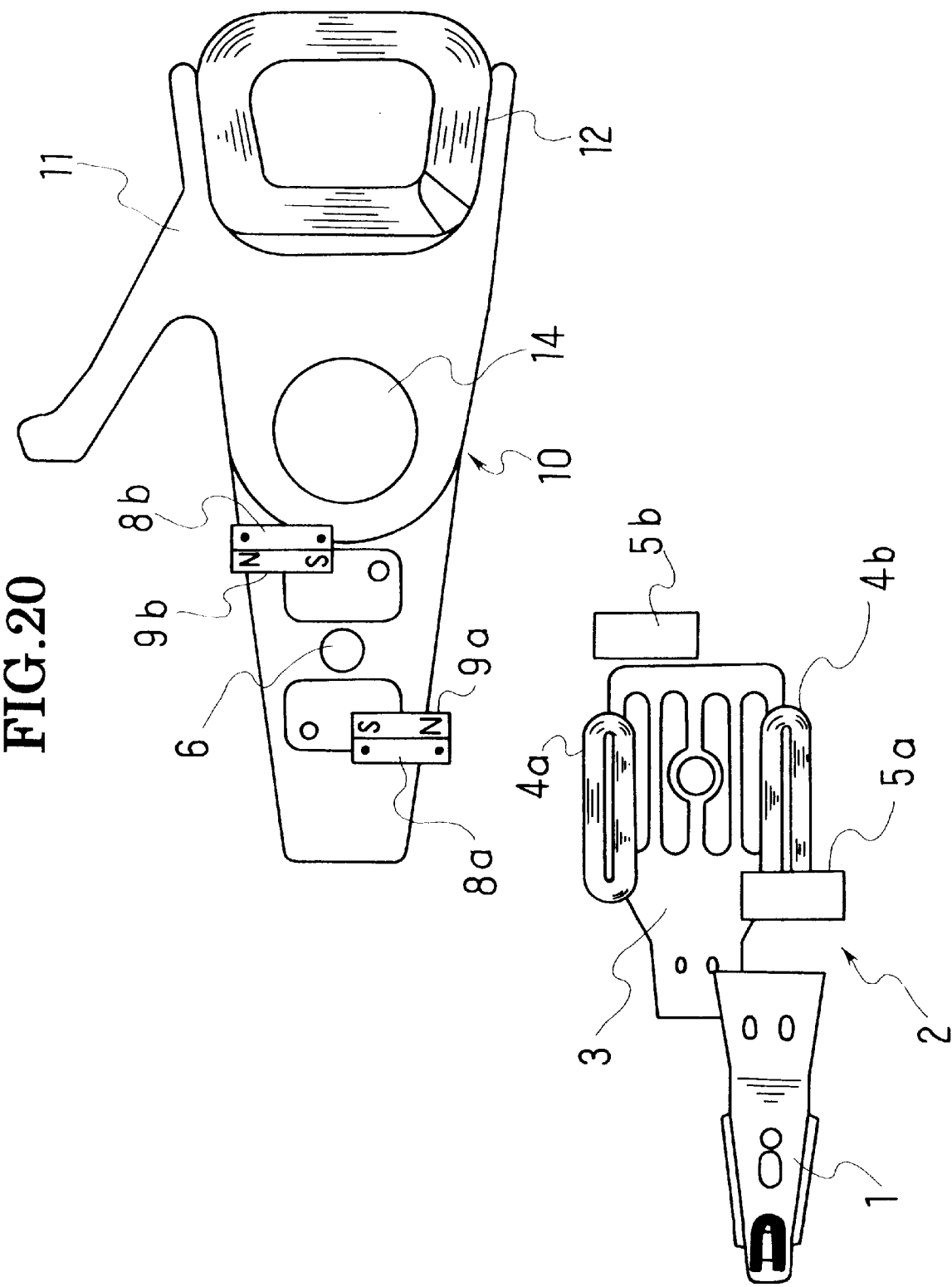
Figure 21:
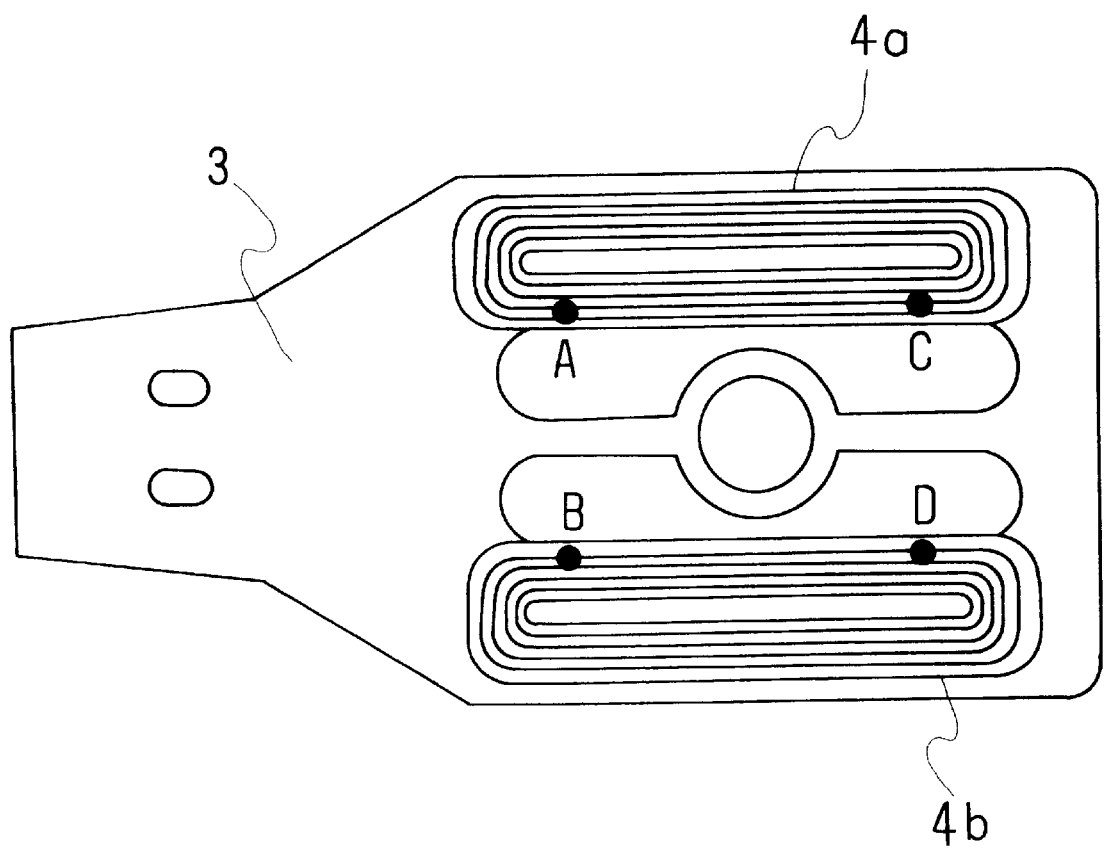
FIG. 21 is an enlarged-scale plan view showing the I shape spring in the embodiment.
Figure 22A:
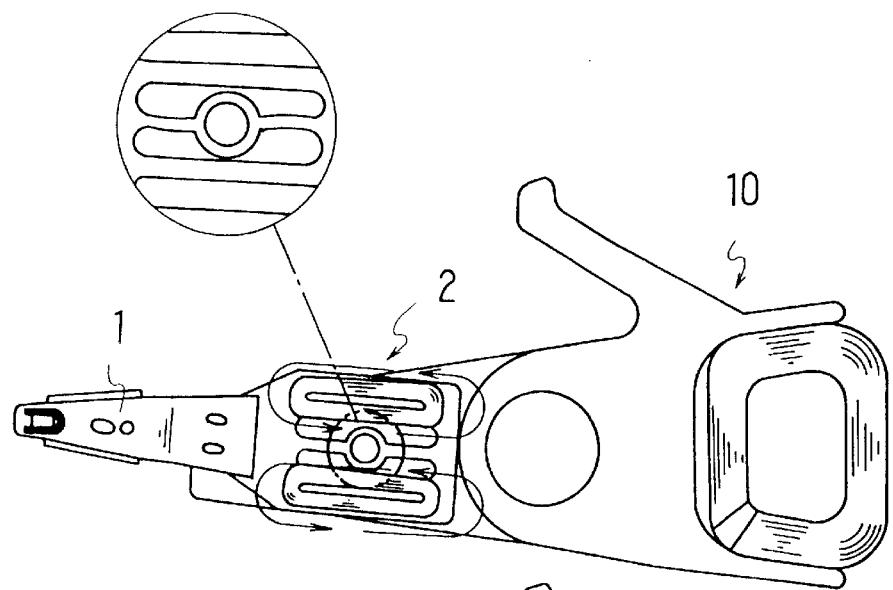
FIGS. 22(a) to 22(c) are views for describing the operation of the fourth embodiment of the magnetic head positioning mechanism.
Figure 22B:
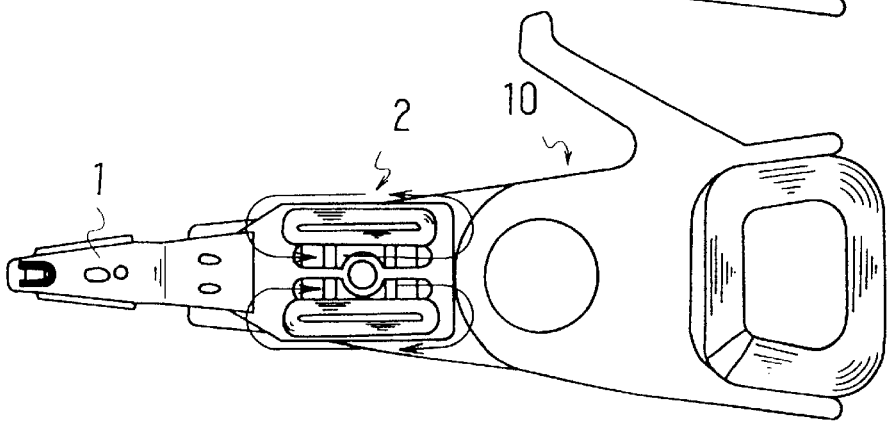
Figure 22C:
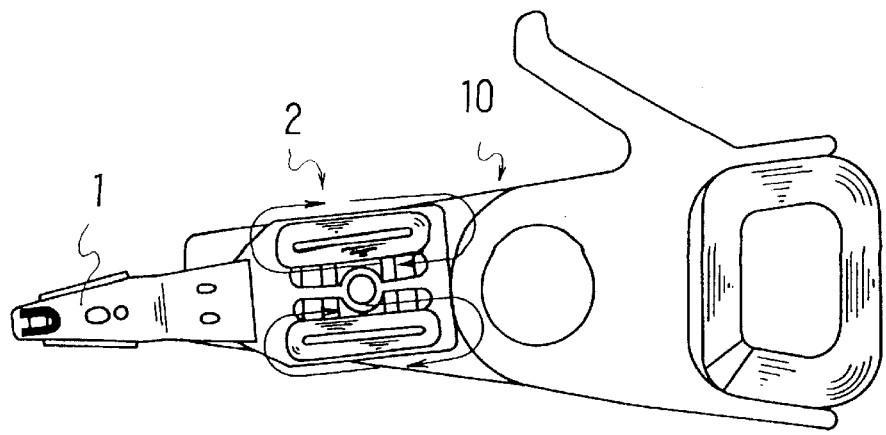

FIG. 18 is a plan view showing the fourth embodiment of the magnetic head positioning mechanism according to the present invention, FIG. 19 is a fragmentary sectional view of the same, and FIG. 20 is an exploded perspective view of the same. FIG. 21 is an enlarged-scale plan view showing the I shape spring in this embodiment. FIGS. 22(a) to 22(c) are views for describing the operation of the fourth embodiment of the magnetic head positioning mechanism, FIGS. 22(a) and 22(b) illustrating the follow operation, FIG. 22(c) illustrating the seek operation.

As shown in these Figures, this embodiment of the magnetic head positioning mechanism has substantially the same construction as the previous first embodiment, comprising the HGAs, the fine actuators 2 and the coarse actuator 10, the fine actuators 2 each including the I shape spring 3, the small coil 4 and the yoke 5.

As shown in FIGS. 20 and 21, the I shape spring 3 in this embodiment has a pair of parallel leaf springs, which extend by equal lengths from the opposite sides of a central caulking part of the fine actuator 2 in the longitudinal direction thereof. As shown in FIG. 20, the pair of parallel leaf springs of the I shape spring 3 may have a uniform width. Alternatively, they may have increasing widths as one goes away form the caulking position.

The latter arrangement is effective in view of securing sufficient rigidity in the advancement direction. However, in case where a pair of small coils as will be described later are disposed at the opposite ends of the fine actuator 2 as in this embodiment, the former arrangement of the pair of parallel leaf springs having a uniform width may be used to reduce both the rotation rigidity and the advancement rigidity.

In this embodiment, the small coil 4 constituting the small VCM, has a pair of small coils 4 (4a and 4b) are disposed on the opposite sides of the fine actuator 2 in the transversal direction thereof, i.e., in a symmetrical arrangement with respect to the pair of parallel leaf springs.

In correspondence to the pair of small coils 4a and 4b, a pair of yoks 5 (5a and 5b) are secured to the steel sheet of the I shape spring 3 having the parallel leaf springs on the side of the steel sheet opposite the side with the small coils 4 mounted thereon. The pair of yokes 5a and 5b are secured to the fine actuator 2 such that they extend in a direction crossing and couple together the pair of small coils 4, which are disposed at the opposite ends of the fine actuator 2. On the side of the coarse actuator 10 has two buried magnet assemblies, which each have a yoke base 8 (8a, 8b) and a pair of magnets 9 (9a, 9b) and face the pair of yokes 5a and 5b when the fine actuator 2 is secured at the caulking position by the set pin member to the coarse actuator 10, thus forming a magnetic circuit.

More specifically, the magnet assemblies having the yoke bases 8 (8a and 8b) and pair permanent magnets (9a, 9b) secured thereto, are buried in each holder arm 11 of the coarse actuator 10 at positions thereof before and behind the set pin member 7 securing the fine actuator 2 in the longitudinal direction thereof such that they face the pair of small coils 4 (4a, 4b).

These magnet assemblies form, together with the pair of small coils 4 and yokes 5 of the fine actuator 2, a small VCM such as to generate torques at four points centered on the caulking position. The permanent magnets 9 (9a and 9b) of the two magnet assemblies buried in the coarse actuator 10 and the pair of small coils 4 (4a and 4b) of the fine actuator 2, are disposed are such that the small coils 4 are located at the opposite ends of the fine actuator 2 in the longitudinal direction thereof (at points A, B, C and D in FIG. 21) and that the magnet poles are in a point symmetry arrangement with respect to the set pin member 7.

When driving the fine actuator 2 (i.e., in the follow operation), the pair of small coils 4a and 4b are energized by applying in-phase currents to them to generate drive torques at four pints on the coils corresponding to the four permanent magnets, centered on the caulking position, for fine driving the head (the state as shown in FIGS. 2(a) and 2(c)).

In the coarse actuator driving (i.e., in the seek operation), the pair of small coils 4a and 4b are energized by applying 180-degree out-of-phase currents to them to generate opposed drive torques transversally of the fine actuator 2 at four points of the coils corresponding to the four permanent magnets, thus securing the fine actuator 2 to the coarse actuator 10 (the state as shown in FIG. 22(b))

As shown, in this embodiment of the magnetic head positioning mechanism, in the follow operation the pair of small coils 4a and 4b are energized by applying in-phase currents to them to generate a rotational torque about the set pin member 7, thus causing flexing of the parallel leaf springs of the fine actuator 2 to fine drive the head.

In the seak operation, the pair of small coils 4a and 4b, at the opposite ends of the leaf springs, are energized by applying 180-degree out-of-phase currents to them to generate opposed electromagnetic forces in them, thus securing the fine actuator 2 to the holder arm 11 while driving the coarse actuator 10.

The commonly called dual coil drive system as in this embodiment, which has the two small coils 4a and 4b, has a demerit that the number of components and the size of the system are inevitably increased. However, a great rotational torque about the set pin member 7 of the fine actuator 2 is obtainable, and the rigidity (rotation rigidity) of the I shape spring 3 of the fine actuator 2 can be sufficiently reduced. The system is thus effective in case where it is sought to cause a great displacement of the HGA 1.

A fifth embodiment of the magnetic head positioning mechanism according to the present invention will now be described with reference to FIGS. 23 to 25.

Figure 23:
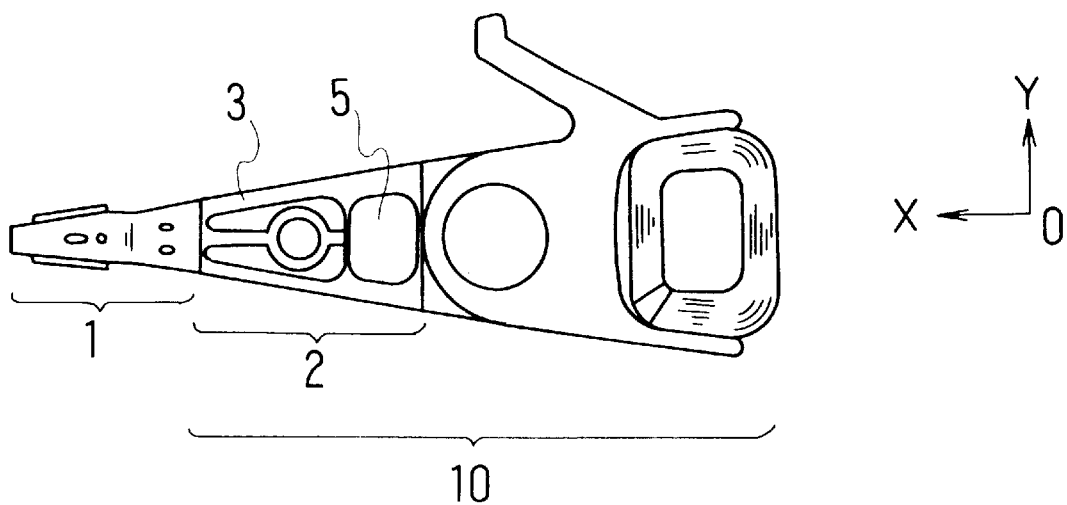
FIGS. 23 and 24 are a plan view and an exploded plan view showing a fifth embodiment of the magnetic head positioning mechanism.
Figure 24:
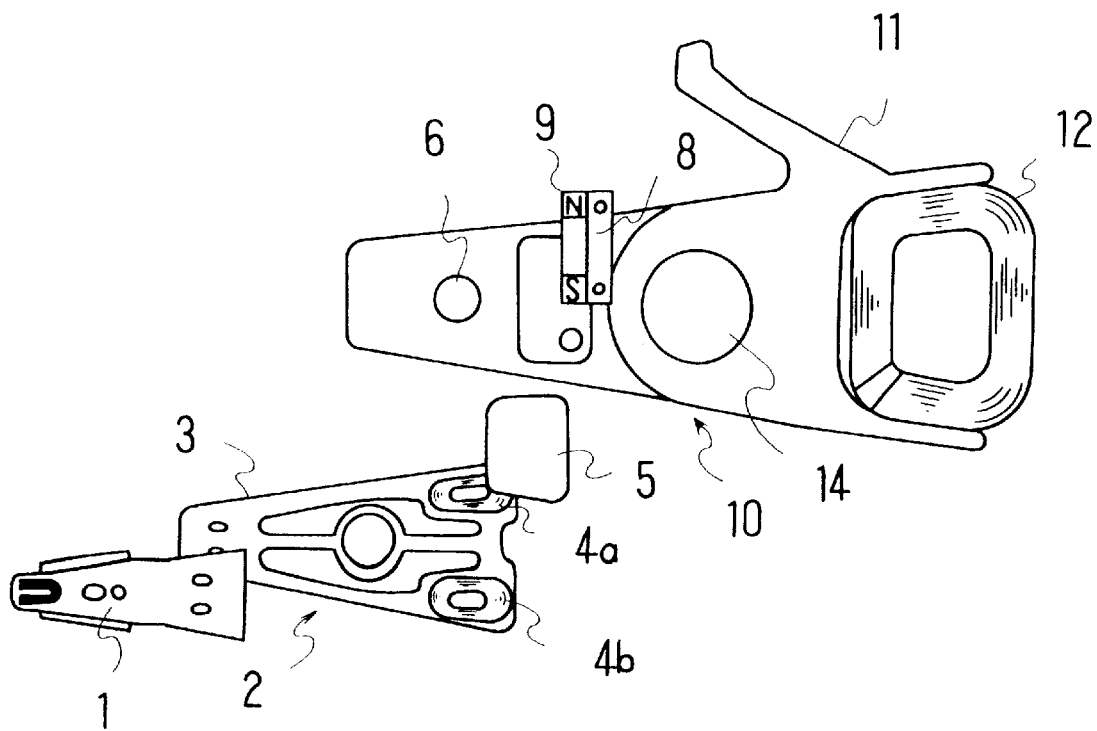
Figure 25A:
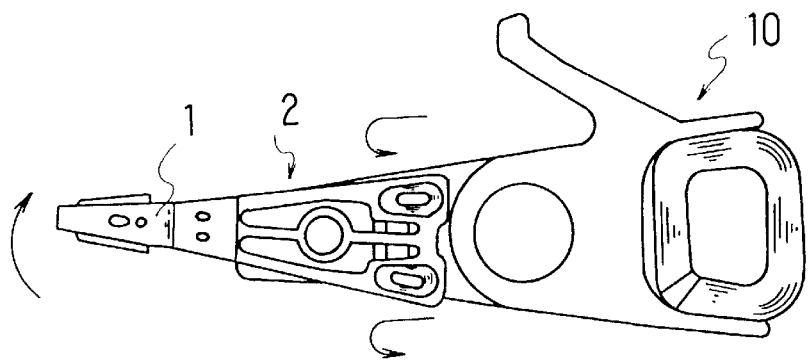
FIGS. 25(a) to 25(c) are views for describing the operation of the fifth embodiment of the magnetic head positioning mechanism.
Figure 25B:
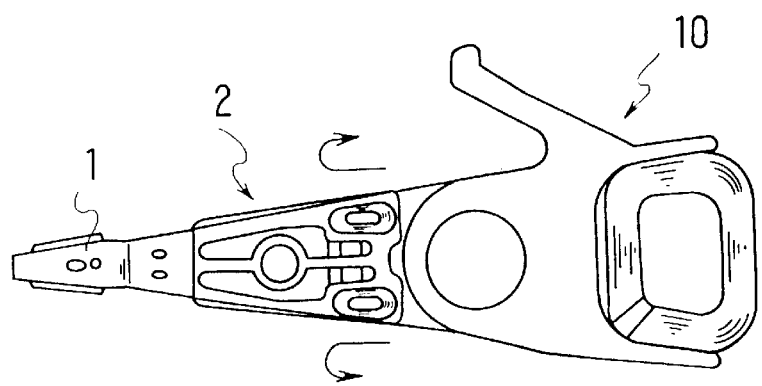
Figure 25C:
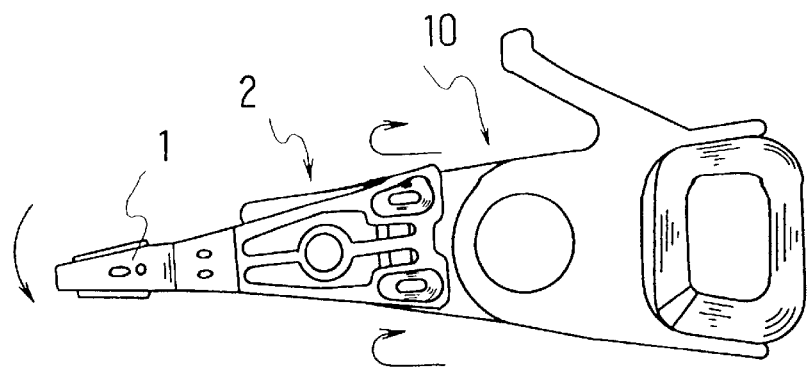

FIG. 23 is a plan view showing the fifth embodiment of the magnetic head positioning mechanism, and FIG. 24 is an exploded plan view of the same. FIGS. 25(a) to 25(c) are views for describing the operation of the fifth embodiment of the magnetic head positioning mechanism, FIGS. 25(a) and 25(c) illustrating the follow operation, FIG. 25(b) illustrating the seek operation.

This embodiment of the magnetic head positioning mechanism, as shown in these Figures, seeks to preclude the demerit in the above fourth embodiment that the size and mass of the drive part are inevitably increased. Specifically, in this embodiment the pair of small coils 4a and 4b are mounted on the fine actuator 2 on transversally opposite sides thereof and on an end portion thereof on the rear side of the caulking position (opposite the HGA 1).

The coarse actuator 10 has two buried magnet assemblies each constituted by a yoke base 8 and a pair of permanent magnets 9 like that described before in connection with the first embodiment. The permanent magnets 9 are disposed such that they face the pair of small coils 4 disposed on the transversally opposite sides of the fine actuator 2.

The I shape spring 3 of the fine actuator 2 in this embodiment, like the fourth embodiment, has a pair of parallel leaf springs, which extend along the longitudinal center line of the fine actuator 2 by equal lengths oppositely from the caulking position and have a uniform width. It is possible, however, to reduce the length of one of the pair parallel leaf springs or increase the width thereof as one goes away from the caulking position.

In this embodiment of the magnetic head positioning mechanism having the above construction, like the previous fourth embodiment, in the driving of the fine actuator 2 (i.e. in the follow operation) the pair of small coils 4 are eneregized by applying in-phase currents to them to generate drive torques at two points on the coils corresponding to the two permanent magnets for finely driving the head (the state as shown in FIGS. 25(a) 25(b)).

In operating the coarse actuator 10 (i.e., in the seek operation), the pair of small coils 4 are energized by applying 180-degree out-of-phase currents to them to generate opposed drive torques transversally of the fine actuator 2 at two points of the coils corresponding to the two permanent magnets, thus securing the fine actuator 2 to the coarse actuator 10 (the state shown in FIG. 25(B)).

A sixth embodiment of the magnetic head positioning mechanism according to the present invention will now be described with reference to FIGS. 26 to 29(a) and 29(b).

Figure 26:
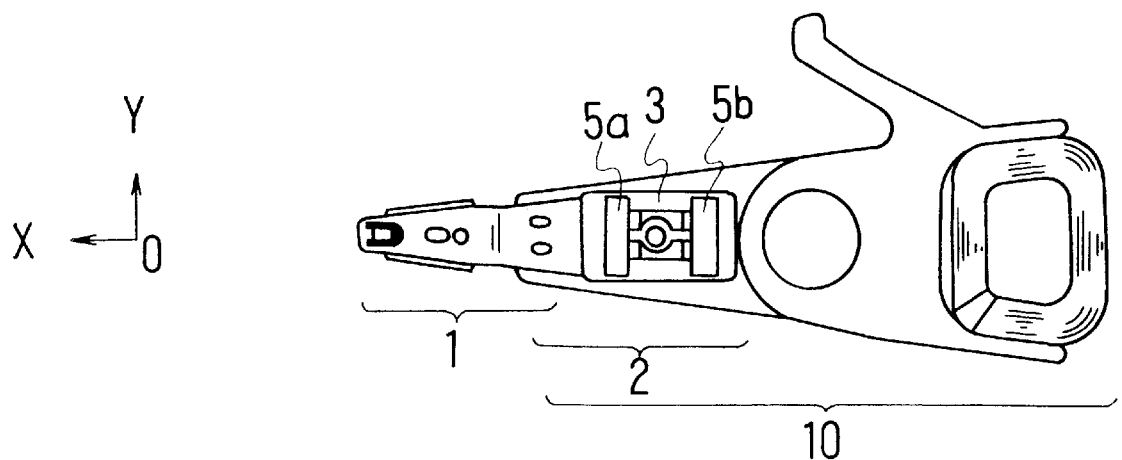
Figure 27:
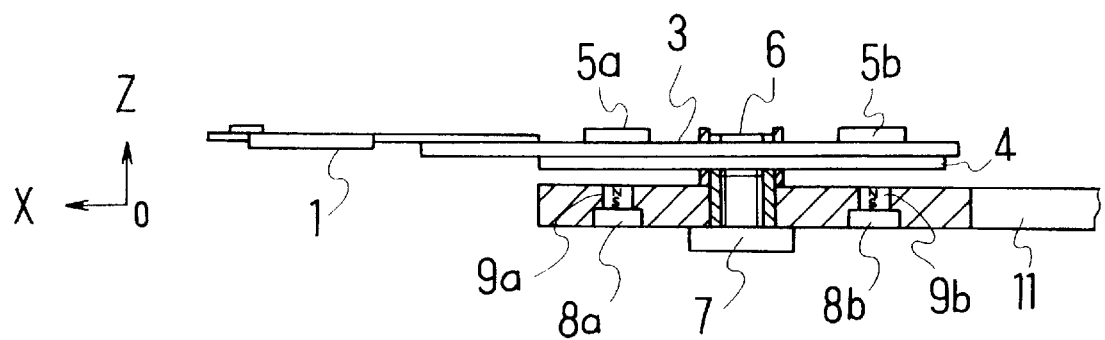
Figures 29A, 29B:
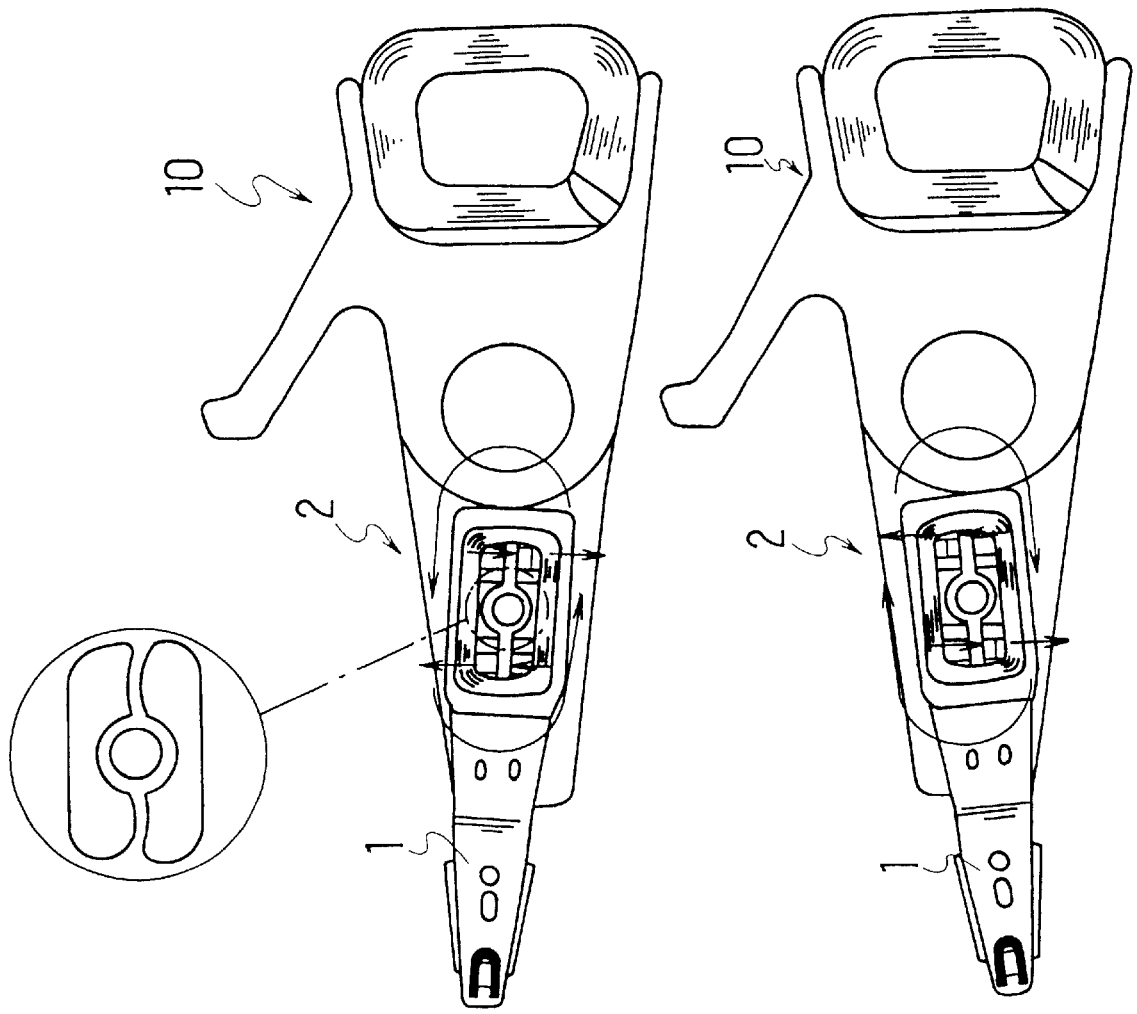
FIGS. 29(a) and 29(b) are views for describing the operation of the sixth embodiment of the magnetic head positioning mechanism, and illustrate the follow operation.

FIG. 26 is a plan view showing the sixth embodiment of magnetic head positioning mechanism, FIG. 27 is a fragmentary sectional view of the same, and FIG. 28 is an exploded plan view. FIGS. 29(a) and 29(b) are views for describing the operation of the sixth embodiment of the magnetic head positioning mechanism, and illustrate the follow operation.

As shown in these Figures, the fine actuator 2 in this embodiment of the magnetic head positioning mechanism, like that in the previous fourth embodiment, has parallel leaf springs extending oppositely from the caulking position along the longitudinal center line of the fine actuator. In this embodiment, a ring-like small coil 4 is disposed such as to enclose the parallel leaf springs and the caulking part.

As shown in FIGS. 26 to 28, this embodiment of the magnetic head positioning mechanism has substantially the same construction and the previous forth embodiment, comprising the HGAs 1, the fine actuators 2 and the coarse actuator 10, the fine actuators 2 each including the L shape spring 3, the small coil 4 and the yoke 5. The I shape spring 3, like the fourth embodiment, has a pair of parallel Leaf springs having an equal length, extending in the longitudinal direction of the fine actuator 2 on the opposite sides of the caulking position 6, the small coil 4 being disposed such as to enclose the pair of parallel leaf springs. The parallel leaf springs of the I shape spring 3 may have a uniform width. However, in a system in which the fine actuator 2 is driven with a single coil (single coil system) as in this embodiment, it is impossible to generate opposed torques with two coils for suppressing the seak direction advancement vibrations (i.e., main resonance) of the fine actuator 2 as in the fourth embodiment.

In this case, it is thus desirable to use leaf springs having increasing widths as one goes away from the set pin member position for ensuring sufficient advancement rigidity. A pair of yokes 5 (5a and 5b) are disposed on the opposite sides of the caulking position 6 in the longitudinal direction of the fine actuator 2. The yokes 5 are provided on the surface of the fine actuator 2 opposite the small coil 4. The coarse actuator 10 has two buried magnet assemblies each having a yoke base 8 (8a, 8b) and a pair of permanent magnets 9 (9a, 9b). The magnet assemblies face the pair of yokes 5.

The four permanent magnets 9 of the pair of magnet assemblies buried in the coarse actuator 10, like the fourth embodiment, are located at four points centered on the caulking position 6 and on portions of the small coil 4 extending in the longitudinal direction of the fine actuator 2, and their poles are in a polar point symmetry with respect to the calking position 6. In the driving of the fine actuator 2 (i.e., in the follow operation), the small coil 4 is energized by applying a drive current thereto, thus generating rotational drive torques at four points on the coil 4 corresponding to the positions of the four permanent magnets centered on the caulking position (see FIG. 29) and slightly driving the head.

As shown, in this embodiment the magnet assemblies each having the yoke 8 (8a, 8b) and a pair of permanent magnets 9 (9a, 9b) connected to the yoke 8, are buried in each holder arm 11 of the coarse actuator 10 on the opposite sides of the set pin member 7 for securing the fine actuator 2 and at positions corresponding portions of the small coil 4 extending in the longitudinal direction of the fine actuator 2, and combined with the small coil 4 and the yokes 5 (5a, 5b) of the fine actuator 2 to form a small VCM for generating drive torques at four points centered on the caulking position. Thus, energizing the small coil 4 by applying a drive current thereto, rotational torques are generated to cause flexing of the parallel leaf springs of the fine actuator 2, thus slightly driving the head gimbal assembly for the follow operation of the head.

This embodiment is suited for application to a case where a great driven displacement is required compared to the first embodiment while servo is not provided up to so high frequency band.

A seventh embodiment of the magnetic head positioning mechanism according to the present invention will now be described with reference to FIGS. 30 to 32.

Figure 30:
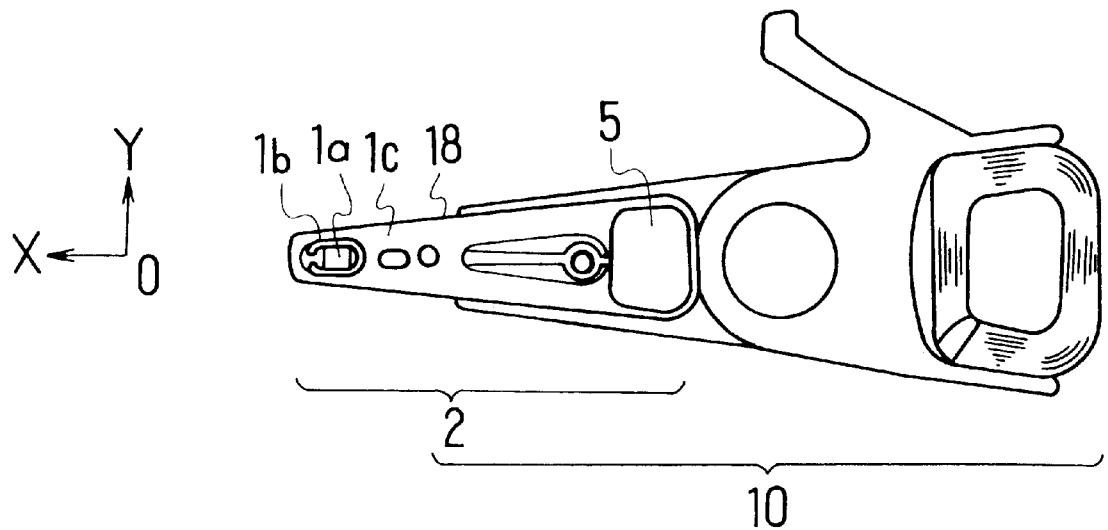
FIGS. 30 to 32 are a plan view, a fragmentary sectional view and an exploded perspective view showing a seventh embodiment of the magnetic head positioning mechanism according to the present invention.
Figure 31:
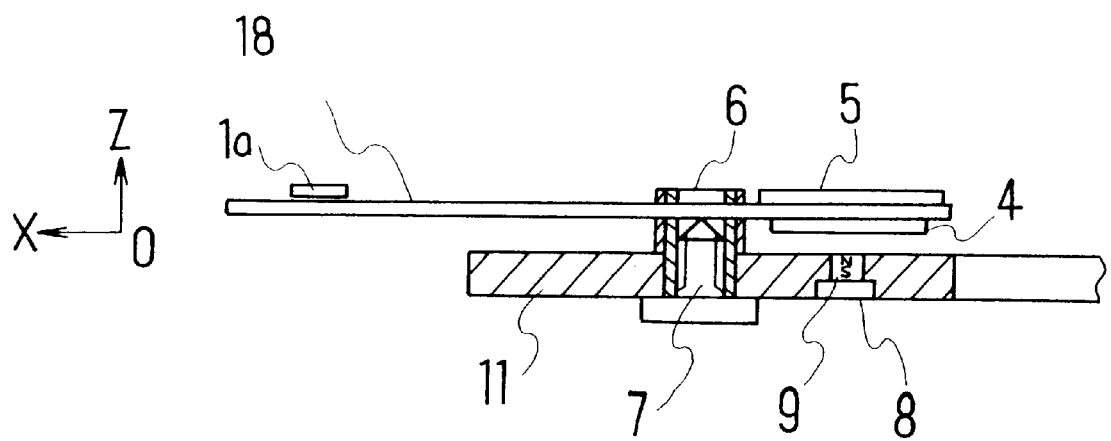
Figure 32:
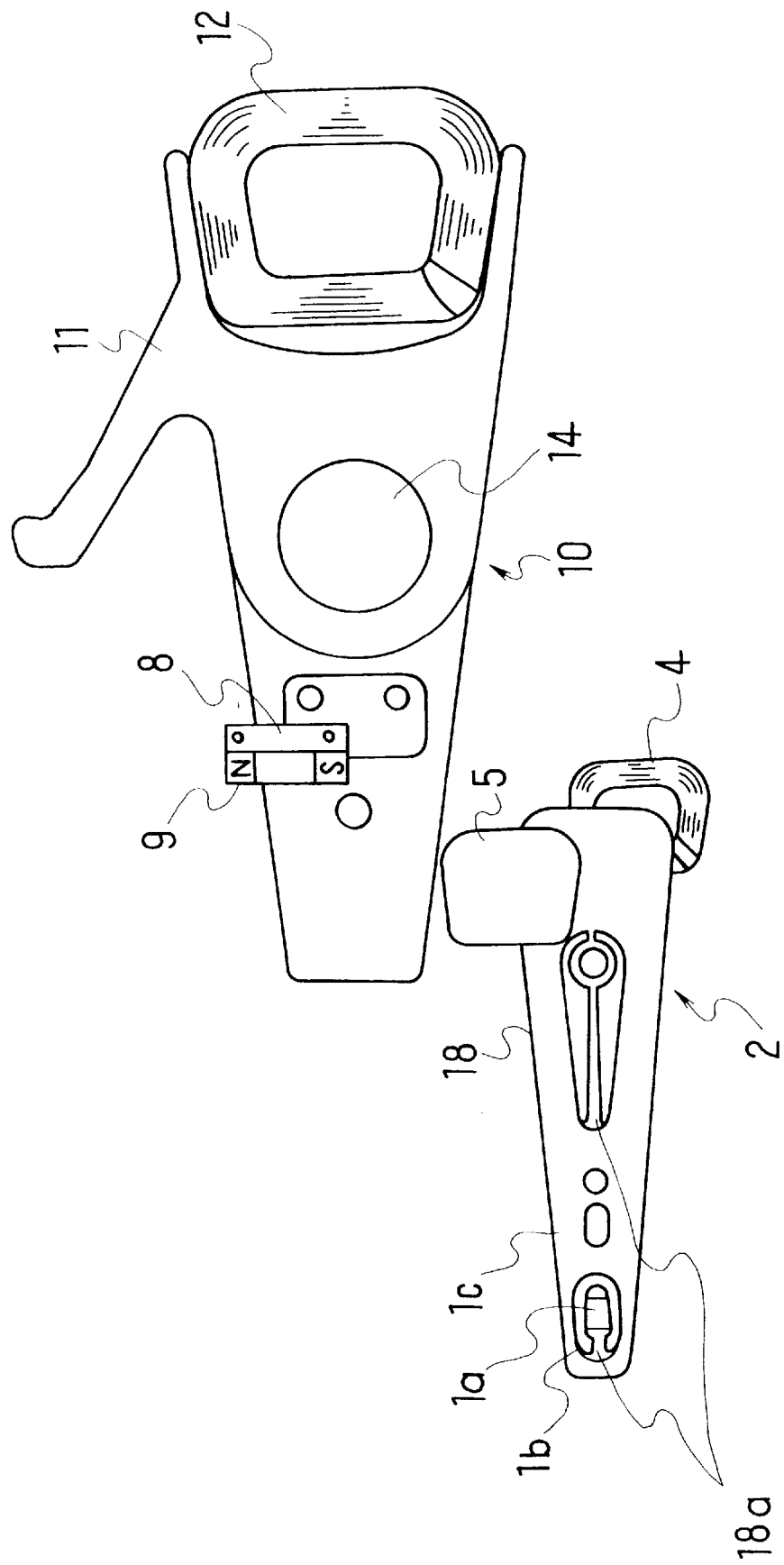

FIG. 30 is a plan view showing a seventh embodiment of the magnetic head positioning mechanism according to the present invention, FIG. 31 is a fragmentary sectional view, and FIG. 32 is an exploded perspective view.

As shown in these Figures, in this embodiment of the magnetic head positioning mechanism according to the present invention, the two-stage actuator, unlike that in the above first to sixth embodiments, is formed such that a load bream 1c and a gimbal spring 1b constituting the HGA 1 and an I shape spring of the fine actuator 2, are integral with each other, i.e., formed form a single thin steel sheet, as the integral HGA/I shape spring 18. In this instance, the I shape spring, which is constituted by a pair of parallel leaf springs extending in opposite longitudinal directions of the fine actuator from the central caulking position thereof, and the gimbal spring 1b for carrying a slider 1a of the HGA 1, are half etched to reduce their thickness.

Specifically, as shown in FIGS. 30 to 32, the two-stage actuator as this embodiment of the magnetic head positioning mechanism comprises the fine actuator 2 and the coarse actuator 10, the fine actuator 2 including an integral HGA/I shape spring 18 along with the small coil 4 and the yoke 5.

In the two-stage actuator of this embodiment, the fine actuator 2 has substantially the same construction as that of the above first embodiment, except for that the I shape spring of the fine actuator 2 is formed together with the load beam 1c and the gimbal spring 1b from a single thin steel sheet as the integral HGA/I shape sirng 18.

In this integral HGA/I shape spring 18, the gimbal sprig 1b other than the load beam 1c of the HGA 1, for carrying the slider 1a, and the I shape spring as a support part of the fine actuator 2, are etched to reduce the thickness (as half etched parts 18a as shown in FIG. 32) to reduce the rigidity.

While in this embodiment the gimbal spring 1b and the I shape spring are etched to the same thickness, it is possible, if desired, to vary to etch these parts to different thickness or half etch the sole gimbal spring. In this case, the fine actuator 2 of this embodiment having the HGAS 1 and the I shape spring integral with each other, can be obtained without processing the load beam, and basically the slider can be pushed with sole bending of the gimbal spring.

It is thus readily possible in design to reduce the size and weight, although it is impossible to exert great load on the slider 1a. A positioning mechanism thus can be realized, which is excellent in processing property, free from structural response up to a high frequency band and suited for fast seek operation.

An eighth embodiment of the magnetic head positioning mechanism according to the present invention will now be described with reference to FIGS. 33 to 35.

Figure 33:
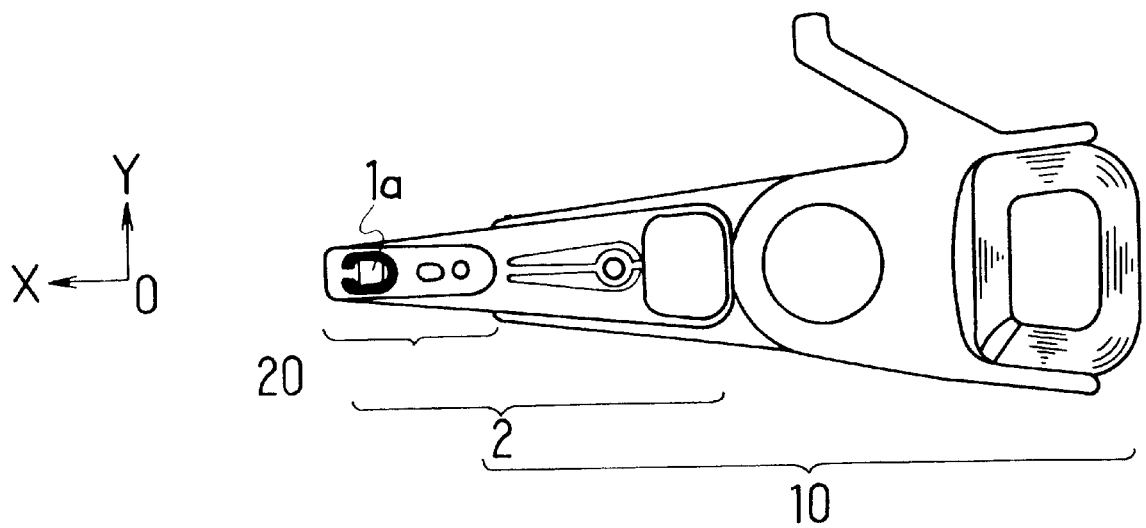
Figure 34:
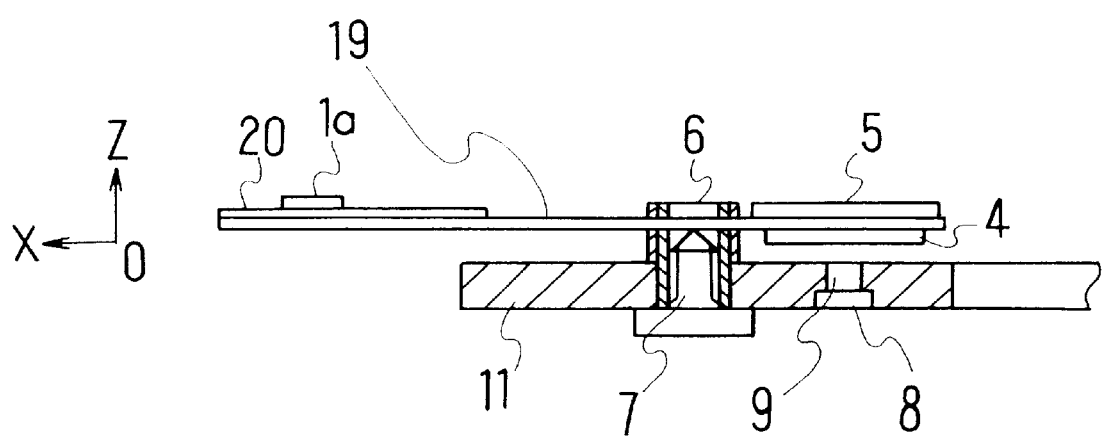
Figure 36A:
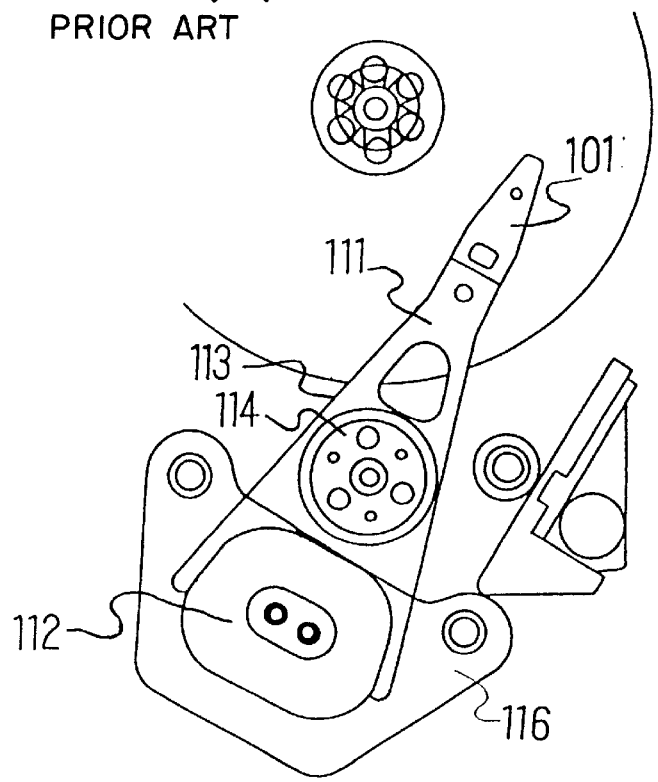
FIGS. 36(a) and 36(b) are plan views showing the prior art magnetic head positioning mechanism, FIG. 36(a) showing the apparatus in a stationary state, FIG. 36(b) showing the apparatus during operation.
Figure 36B:
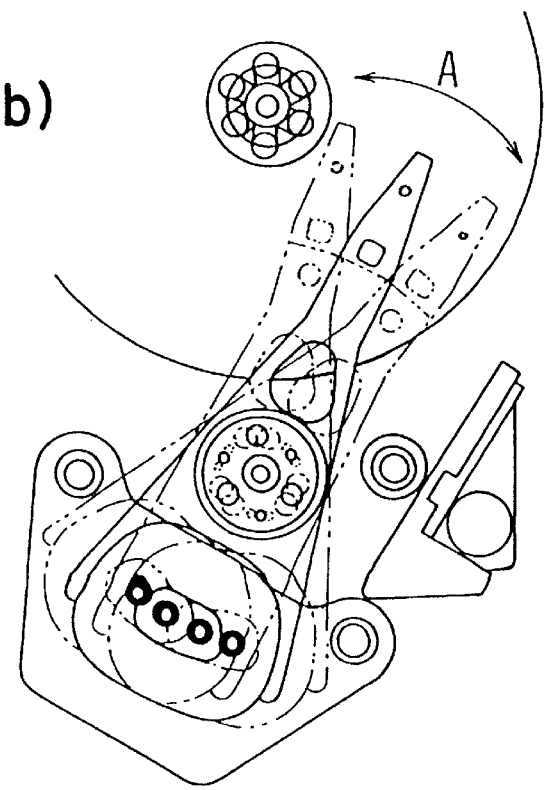
Figure 37:
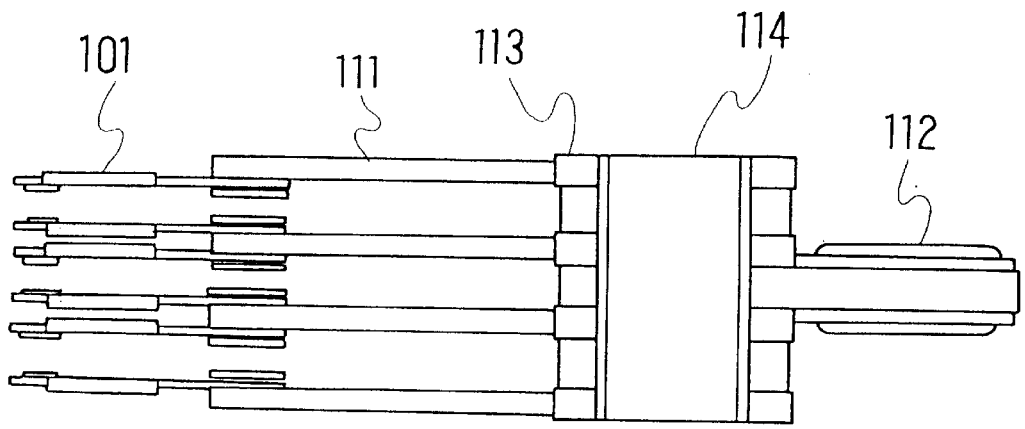
FIG. 37 is a side view showing the magnetic head positioning mechanism shown in FIG. 36.
Figure 38:
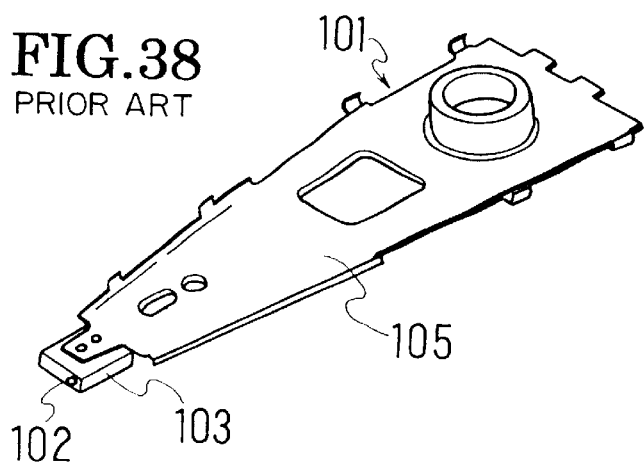
FIG. 38 is a perspective view showing a head gimbal assembly in the magnetic head positioning mechanism shown in FIG. 36.
Figure 39:
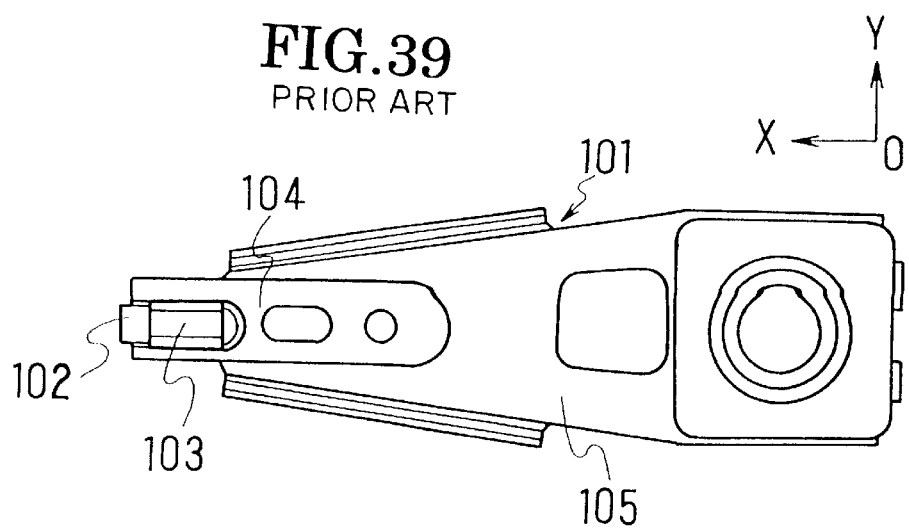
FIG. 39 is a bottom view showing the same mechanism.
Figure 40:
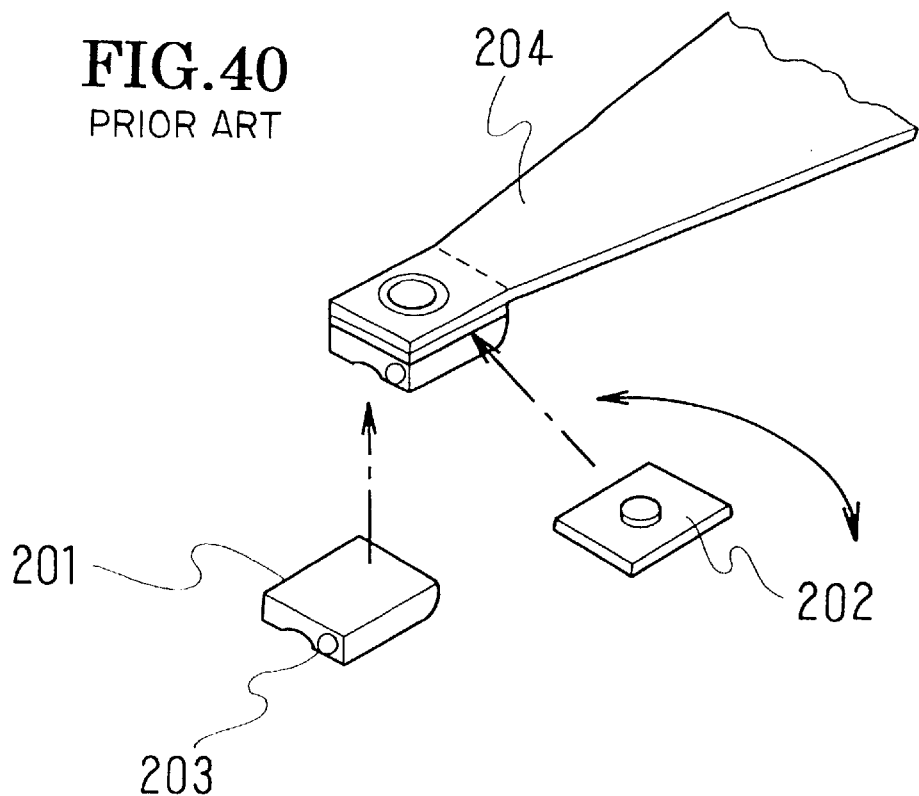
FIGS. 40 to 43 show three kinds of two-stage actuators.
Figure 41A:
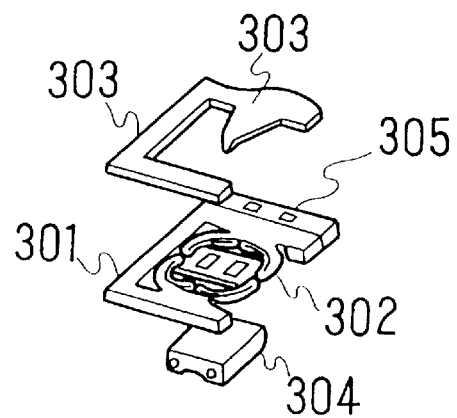
Figure 41B:
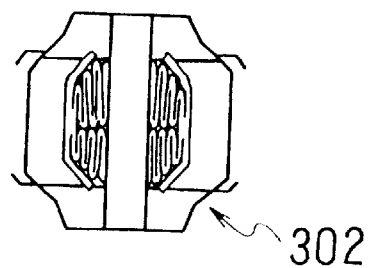
Figure 42:
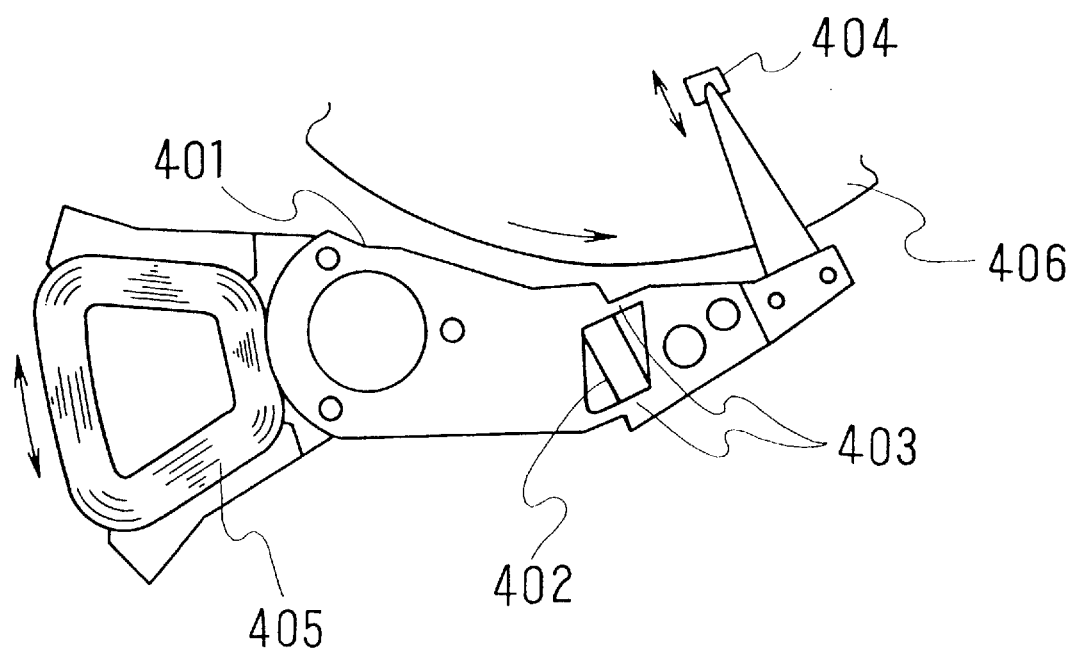
Figure 43A:
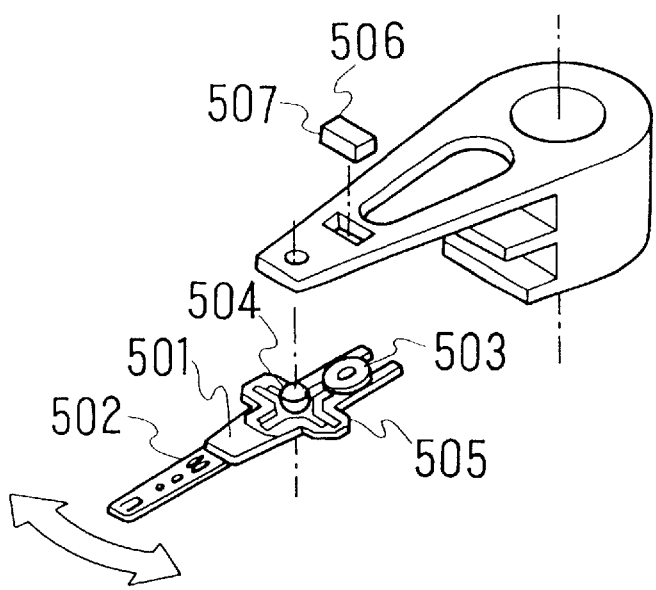
Figure 43B:
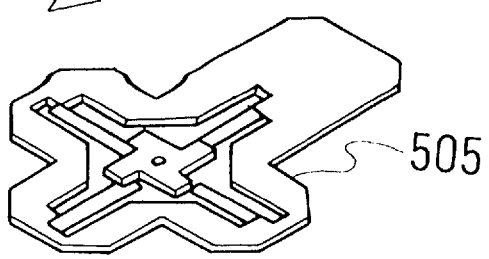

FIG. 33 is a plan view showing an eighth embodiment of the magnetic head positioning mechanism according to the present invention, FIG. 34 is a fragmentary sectional view, and FIG. 35 is an exploded perspective view.

As shown in these Figures, in this embodiment of the magnetic head positioning mechanism according to the present invention, the two-stage actuator, unlike that in the preceding seventh embodiment, is such that the load beam of the HGA 1 and the I shape spring of the fine actuator 2 are formed from as single thin steel sheet as an intregral load bream/I shape spring 19, while a gimbal spring member 20 prepared separately from a steel sheet having a different thickness is connected by laser beam welding or like means to the load beam of the integral load beam/I shape spring 19.

As shown in FIGS. 33 to 35, the two-stage actuator of this embodiment comprises the gimbal spring 20, the fine actuator 2 and the coarse actuator 10. The fine actuator 2 includes the integral load beam/I shape spring 19, the small coil and the yoke 5.

In this embodiment, in the integral HGA/I shape spring 17 the gimbal spring having the thickness reduced by the half etching, is completely removed, and a gimbal spring member 20 prepared separately from a thin steel sheet is connected as a substitute by means of laser beam spot welding to the integral load beam/I shape spring 19.

This method of preparing the integral load beam/I shape spring 18 by connecting the gimbal spring member separately prepared alone to the I shape spring, is suitable in case where thickness of the design gimbal spring thickness and I shape spring are extremely different. For example, in the case of reducing the thickness of the gimbal spring by means of half etching as in the integral HGA/I shape spring in the seventh embodiment, it is possible to reduce the thickness down to only about one half.

Further etching requires great time and cost. Besides, in this case the thickness accuracy is spoiled, resulting in unfeasibly great fluctuations of the slider support rigidity.

In such a case, the method as in this embodiment is suitable. That is, the sole gimbal spring which is required to have a reduced thickness is separately prepared, and connected as a gimbal spring member 20 to the I shape spring.

As has been described in the foregoing, the magnetic head positioning mechanism according to the present invention is a two-stage actuator, in which each HGA is slightly driven independently by electromagnetically causing flexing of the leaf spring. In this structure, by using I shape springs having different lengths as the leaf spring of the fine actuator, it is possible to design a compact drive spring having high advancement rigidity and low rotation rigidity. Thus, a small size, highly accurate positioning mechanism can be realized, which has satisfactory vibration characteristics free from main resonance of actuator up to a high frequency band and also excellent response characteristics.

Furthermore, by providing two small coils side by side on the fine actuator to form two small VCMs and controlling the phase of currents caused through the two small coils, a highly accurate positioning mechanism can be realized, which can meet both fast access performance and response by varying the rigidity of the drive part in the seek operation and the follow operation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A magnetic head positioning mechanism constituted by a two-stage actuator comprising:

a fine actuator including a head gimbal assembly with a magnetic head provided thereon at an end thereof; and a coarse actuator supporting the fine actuator secured thereto at one end thereof, the coarse actuator having a portion adjacent the other end rotatably supported on a shaft;

the fine actuator having a spring frame and a spring member provided therein and extending toward the head gimbal assembly, the spring member having an intermediate portion secured to a set pin member provided in and projecting from the coarse actuator, the fine actuator being thereby secured to and supported by the coarse actuator;

a voice coil motor being provided between the fine and coarse actuators, the voice coil motor being constituted by a small coil, a yoke a and permanent magnet;

the spring member of the fine actuator being flexed by a drive force generated in the fine actuator with energization of the voice coil motor small coil caused by current application thereto, thereby causing slight rotation of the head gimbal assembly in the fine actuator; and wherein the spring member consists of a pair of spring members disposed on the opposite sides of the set pin member, one of the paired spring members having a larger length than the other.

2. The magnetic head positioning mechanism according to claim 1, wherein the spring frame of the fine actuator is constituted by a thin sheet-like frame and an I shape spring having a leaf spring provided in the frame.

3. The magnetic head positioning mechanism according to claim 1, wherein the spring member having the larger length has increasing spring widths as one goes away from the set pin member.

4. The magnetic head positioning mechanism according to claim 1, wherein the voice coil motor small coil is disposed on the side of the set pin member of the fine actuator opposite the head gimbal assembly.

\* \* \* \* \*